United States Patent
Mizoguchi et al.

(10) Patent No.: US 8,381,707 B2
(45) Date of Patent: Feb. 26, 2013

(54) INTERNAL COMBUSTION ENGINE AIR-FUEL RATIO CONTROL APPARATUS AND METHOD

(75) Inventors: Hiroaki Mizoguchi, Nagoya (JP); Norihisa Nakagawa, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 534 days.

(21) Appl. No.: 12/682,919

(22) PCT Filed: Jan. 27, 2009

(86) PCT No.: PCT/IB2009/000128
§ 371 (c)(1),
(2), (4) Date: Apr. 14, 2010

(87) PCT Pub. No.: WO2009/106940
PCT Pub. Date: Sep. 3, 2009

(65) Prior Publication Data
US 2010/0217506 A1    Aug. 26, 2010

(30) Foreign Application Priority Data
Feb. 28, 2008 (JP) ................................. 2008-047676

(51) Int. Cl.
*F02D 41/00* (2006.01)
*F01N 3/00* (2006.01)
(52) U.S. Cl. .......................................... 123/696; 60/285
(58) Field of Classification Search ................... 60/285, 60/286, 287, 303; 123/675, 679, 683, 696; 701/103, 109
See application file for complete search history.

(56) References Cited

U.S. PATENT DOCUMENTS

| | | | |
|---|---|---|---|
| 5,557,929 A * | 9/1996 | Sato et al. ........................ | 60/276 |
| 5,771,688 A * | 6/1998 | Hasegawa et al. ............... | 60/276 |
| 6,289,673 B1 * | 9/2001 | Tayama et al. ................... | 60/285 |
| 6,481,201 B2 * | 11/2002 | Kako et al. ........................ | 60/285 |
| 6,502,389 B2 * | 1/2003 | Katayama et al. ............... | 60/285 |
| 6,619,032 B2 * | 9/2003 | Kakuyama et al. .............. | 60/277 |
| 6,637,194 B2 * | 10/2003 | Kakuyama et al. .............. | 60/285 |
| 6,766,640 B2 * | 7/2004 | Ishizuka et al. .................. | 60/285 |
| 6,769,243 B2 * | 8/2004 | Lewis et al. ...................... | 60/277 |

(Continued)

FOREIGN PATENT DOCUMENTS

| | | |
|---|---|---|
| DE | 10 2007 025 379 | 6/2008 |
| JP | 6 249032 | 9/1994 |

(Continued)

*Primary Examiner* — Thomas Moulis
(74) *Attorney, Agent, or Firm* — Oblon, Spivak, McClelland, Maier & Neustadt, L.L.P.

(57) ABSTRACT

Internal combustion engine air-fuel ratio control apparatus and method in which the target air-fuel ratio of exhaust gas flowing into an exhaust-gas purification catalyst unit is controlled through at least proportional-integral control such that the correction amount per unit time of the oxygen amount in said catalyst unit is maintained constant. When the intake air amount is smaller than a predetermined amount and the air-fuel ratio detected by an oxygen sensor provided downstream of the catalyst unit is rich, the target air-fuel ratio is controlled to suppress an increase in the air-fuel ratio in the exhaust-gas purification catalyst unit. Accordingly, even if rapid acceleration operation is performed in a state where the intake air amount is extremely small and the air-fuel ratio detected by the oxygen sensor is rich, NOx in exhaust gas can be sufficiently removed through reduction reactions at the exhaust-gas purification catalyst unit.

20 Claims, 7 Drawing Sheets

U.S. PATENT DOCUMENTS

| | | | |
|---|---|---|---|
| 6,854,262 B2 * | 2/2005 | Yoshizawa et al. | 60/276 |
| 6,880,329 B2 * | 4/2005 | Iida et al. | 60/285 |
| 7,104,047 B2 * | 9/2006 | Takubo | 60/285 |
| 7,677,027 B2 * | 3/2010 | Iida et al. | 60/277 |
| 7,694,508 B2 * | 4/2010 | Iida et al. | 60/285 |
| 7,895,826 B2 * | 3/2011 | Takubo | 60/285 |
| 2002/0023432 A1 * | 2/2002 | Ishizuka et al. | 60/285 |
| 2003/0159434 A1 * | 8/2003 | Ikemoto et al. | 60/285 |
| 2003/0196428 A1 * | 10/2003 | Iida et al. | 60/285 |
| 2006/0005533 A1 * | 1/2006 | Takubo | 60/285 |
| 2007/0220862 A1 * | 9/2007 | Suehiro et al. | 60/277 |
| 2008/0097680 A1 * | 4/2008 | Yoshioka | 701/103 |
| 2008/0147297 A1 | 6/2008 | Nakagawa et al. | |
| 2008/0148711 A1 | 6/2008 | Takubo | |

FOREIGN PATENT DOCUMENTS

| | | |
|---|---|---|
| JP | 11 82114 | 3/1999 |
| JP | 2000 303880 | 10/2000 |
| JP | 2003 254130 | 9/2003 |
| JP | 2007 107512 | 4/2007 |
| WO | 2007 032534 | 3/2007 |

* cited by examiner

INTERNAL COMBUSTION ENGINE AIR-FUEL RATIO CONTROL APPARATUS AND METHOD

REFERENCE TO PRIORITY APPLICATION

The disclosure of Japanese Patent Application No. 2008-47676 filed on Feb. 28, 2008, including the specification, drawings and abstract is incorporated herein by reference in its entirety.

BACKGROUND OF THE INVENTION

1. Field of the Invention

The invention relates to an air-fuel ratio control apparatus and an air-fuel ratio control method for an internal combustion engine having an exhaust-gas purification catalyst unit disposed in an exhaust gas passage. In particular, the invention relates to such an air-fuel ratio control apparatus and an air-fuel ratio control method that control the fuel supply amount based on the output value of an air-fuel ratio sensor such that the air-fuel ratio of exhaust gas flowing into the exhaust-gas purification catalyst unit equals a target air-fuel ratio.

2. Description of the Related Art

Three-way catalyst units are often used in internal combustion engines of vehicles. A three-way catalyst unit purifies exhaust gas by facilitating the oxidization reactions of HC (hydrocarbon) and CO (carbon monoxide) that are unburned components and by facilitating the reduction reactions of NOx that are produced through reactions between nitrogen in air and oxygen left unburned in exhaust gas. To efficiently use such oxidization and reduction performances of a three-way catalyst unit, the air-fuel ratio of the internal combustion engine, which represents the combustion state of the internal combustion engine, needs to be maintained near the stoicheiometric air-fuel ratio. Thus, for fuel injection control in an internal combustion engine, typically, an oxygen sensor (oxygen concentration sensor) is provided which detects whether the air-fuel ratio of exhaust gas is rich or lean, that is, lower or higher than the stoicheiometric air-fuel ratio based on the concentration of oxygen left in exhaust gas, and air-fuel ratio feedback control that corrects the fuel supply amount based on the output of the oxygen sensor is executed.

For example, Japanese Patent Applications No. 11-82114 (JP-A-11-82114) and No. 2007-107512 (JP-A-2007-107512) describe double-oxygen-sensor systems for air-fuel ratio feedback control. According to these systems, an oxygen sensor for detecting the oxygen concentration in exhaust gas is arranged upstream of a three-way catalyst unit so as to be as close to the combustion chambers of the internal combustion engine as possible, and another oxygen sensor is provided downstream of the three-way catalyst unit. The downstream oxygen sensor is used to compensate for the variation of the output characteristic of the upstream oxygen sensor. That is, as the exhaust gas discharged from the internal combustion engine flows to the downstream side of the three-way catalyst unit, the exhaust gas is agitated and the oxygen concentration in the entire exhaust gas becomes substantially uniform due to the catalytic effects of the three-way catalyst unit. Therefore, the output of the downstream oxygen sensor changes more gently than the output of the upstream oxygen sensor does, and thus the downstream oxygen sensor can more reliably detect whether the air-fuel ratio of the entire air-fuel mixture is rich or lean. In such a double-oxygen-sensor system, sub-air-fuel ratio feedback control is executed using the downstream oxygen sensor, as well as the main air-fuel ratio feedback control that is executed using the upstream oxygen sensor. For example, a constant related to the main air-fuel ratio feedback control is corrected based on the output of the downstream oxygen sensor so as to compensate for the variation of the output characteristic of the upstream oxygen sensor and thus improve the accuracy of the air-fuel ratio control.

Further, in recent years, an internal combustion engine has been developed which incorporates a three-way catalyst unit having an oxygen storage capability and controls the air-fuel ratio flowing into the three-way catalyst unit such that the purification performance of the three-way catalyst unit can be utilized in a stable manner. Having an oxygen storage capability, a three-way catalyst unit stores surplus oxygen when the air-fuel ratio of exhaust gas is lean (higher than the stoicheiometric air-fuel ratio) and releases the oxygen stored in the three-way catalyst unit when the air-fuel ratio of exhaust gas is rich (lower than the stoicheiometric air-fuel ratio), and such an oxygen storage capability of a three-way catalyst unit is limited. As such, in order to efficiently utilize the oxygen storage capability of a three-way catalyst unit, it is important to maintain the amount of oxygen stored in the three-way catalyst unit at a predetermined amount, for example, at a half of the maximum oxygen storage capacity of the three-way catalyst unit. In this case, the three-way catalyst unit can always provide constant oxygen storage and release effects despite whether the air-fuel ratio of exhaust gas is rich or lean, enabling continuous use of constant oxidization and reduction effects of the three-way catalyst unit.

For example, an air-fuel ratio control apparatus is known which is incorporated in an internal combustion engine in which the amount of oxygen stored in a three-way catalyst unit is controlled to a desired level in order to maintain a desired level of purification performance of the three-way catalyst unit. This air-fuel ratio control apparatus incorporates two air-fuel ratio sensors provided upstream and downstream of the three-way catalyst unit, respectively. More specifically, the air-fuel ratio sensor provided upstream of the three-way catalyst unit is a linear air-fuel ratio sensor that linearly detects the air-fuel ratio of exhaust gas, and the air-fuel ratio sensor provided downstream of the three-way catalyst unit is an oxygen sensor that outputs voltage that varies depending upon whether the air-fuel ratio of exhaust gas is rich or lean, that is, whether it is lower or higher than the stoicheiometric air-fuel ratio. According to this air-fuel ratio control apparatus, the air-fuel ratio of the exhaust gas flowing into the three-way catalyst unit is detected using the linear air-fuel ratio sensor that is provided upstream of the three-way catalyst unit, and the state of the air-fuel ratio of the atmosphere in the three-way catalyst unit is detected by the oxygen sensor that is provided downstream of the three-way catalyst unit, and the target air-fuel ratio of the exhaust gas flowing into the three-way catalyst unit is controlled based on the output of the oxygen sensor, and feedback control of the air-fuel ratio of the exhaust gas flowing into the three-way catalyst is executed based on the output of the linear air-fuel ratio sensor such that said air-fuel ratio equals the target air-fuel ratio.

In the case of an air-fuel ratio control apparatus that maintains the oxygen amount in the three-way catalyst at a constant level by executing feedback control of the target air-fuel ratio of the exhaust gas flowing into the three-way catalyst unit based on the output of the oxygen sensor and controls the air-fuel ratio of the exhaust gas flowing into the three-way catalyst unit to the target air-fuel ratio by executing feedback control of the fuel injection amount based on the output of the linear air-fuel ratio sensor, in a state where the intake air amount is large, such when an acceleration operation is being performed, (will hereinafter be referred to as "large intake-air-amount state" where necessary), the amount of oxygen stored in the three-way catalyst tends to be corrected by a large amount, and this may cause the air-fuel ratio of the atmosphere in the three-way catalyst to largely deviate from a target air-fuel ratio range near the stoicheiometric air-fuel ratio where the three components in exhaust gas, that is, HC, CO, and NOx can be all removed at removal rates of 80% or more. The target air-fuel ratio range will hereinafter be referred to as "purification window" where necessary.

In the case of an air-fuel ratio control apparatus that maintains the oxygen amount in the three-way catalyst at a constant level by executing feedback control of the target air-fuel ratio of the exhaust gas flowing into the three-way catalyst unit based on the output of the oxygen sensor and controls the air-fuel ratio of the exhaust gas flowing into the three-way catalyst unit to the target air-fuel ratio by executing feedback control of the fuel injection amount based on the output of the linear air-fuel ratio sensor, even if the target air-fuel ratio of the exhaust gas flowing into the three-way catalyst is kept unchanged, the degree of oxygen adsorption to the three-way catalyst and the degree of oxygen release from the three-way catalyst vary depending upon the intake air amount. For example, in a case where the target air-fuel ratio of the exhaust gas flowing into the three-way catalyst unit is controlled to a lean value, that is, a value higher than the stoicheiometric air-fuel ratio, the larger the intake air amount, the larger the amount of oxygen stored to the three-way catalyst unit per unit time, and therefore the sooner it reaches the maximum oxygen storage capacity of the three-way catalyst unit. As such, even in a case where the target air-fuel ratio of the exhaust gas flowing into the three-way catalyst unit is maintained at a constant value, the larger the intake air amount, the larger the amount of oxygen stored to the three-way catalyst unit per unit time, and thus the larger the correction amount for the oxygen amount in the three-way catalyst unit, increasing the possibility of the air-fuel ratio of the atmosphere in the three-way catalyst unit largely deviating from the purification window.

However, such deviation of the air-fuel ratio of the atmosphere in an exhaust-gas purification catalyst unit having an oxygen storage capacity (e.g., three-way catalyst) from its purification window can be prevented and thus a resultant increase in the emissions of the internal combustion engine can be prevented by, for example, maintaining the correction amount per unit time of the oxygen amount in the exhaust-gas purification catalyst unit at a constant level, that is, by maintaining the amount of oxygen stored to or released from the exhaust-gas purification catalyst unit per unit time at a constant level.

To accomplish the above control, for example, in a case where feedback control of the target air-fuel ratio of the exhaust gas flowing into the exhaust-gas purification catalyst unit is executed based on the output of an oxygen sensor provided downstream of the exhaust-gas purification catalyst unit and the intake air amount, PI control (Proportional-Integral control) is executed as said feedback control. In this PI control, in order to maintain the correction amount per unit time of the oxygen amount in the exhaust-gas purification catalyst unit at a constant level, the proportional correction term for the PI control is multiplied by a first correction coefficient that is made smaller the larger the intake air amount, and the integral correction term for the PI control is multiplied by a second correction coefficient that is made larger the larger the intake air amount.

However, if such control is executed in a state where the intake air amount is extremely small, like during idling of the internal combustion engine, and the air-fuel ratio detected by the oxygen sensor provided downstream of the exhaust-gas purification catalyst unit is rich, NOx may not be sufficiently removed through reduction reactions at the exhaust-gas purification catalyst unit. During the control described above, if the intake air amount is extremely small and the air-fuel ratio detected by the oxygen sensor is rich, the first correction coefficient that is multiplied by the proportional correction term for the PI control is made larger than it is when the intake air amount is large, whereby the target air-fuel ratio of the exhaust gas flowing into the exhaust-gas purification catalyst unit is increased to a lean value. At this time, however, if an operation that causes a sharp increase in the intake air amount, such as a rapid acceleration operation, is performed, the air-fuel ratio of the atmosphere in the exhaust-gas purification catalyst unit sharply increases, and this may result in the exhaust-gas purification catalyst unit failing to sufficiently remove NOx in exhaust gas through reduction reactions.

SUMMARY OF THE INVENTION

The invention provides an air-fuel ratio control apparatus and an air-fuel ratio control method for an internal combustion engine in which feedback control of the target air-fuel ratio of the exhaust gas is executed based on the output of an oxygen sensor provided downstream of an exhaust-gas purification catalyst unit and the intake air amount, the feedback control incorporating at least PI (Proportional-Integral) control in which the proportional correction term is multiplied by a first correction coefficient that is made smaller the larger the intake air amount and the integral correction term is multiplied by a second correction coefficient that is made larger the larger the intake air amount, whereby the amount by which the oxygen amount in the exhaust-gas purification catalyst unit is corrected per unit time is maintained at a constant level. According to the air-fuel ratio control apparatus and method of the invention, even if an operation that causes a sharp increase in the intake air amount, such as a rapid acceleration operation, is performed in a state where the intake air amount is extremely small, like during idling of the internal combustion engine, and the air-fuel ratio detected by the oxygen sensor is rich, NOx in exhaust gas can be sufficiently removed through reduction reactions at the exhaust-gas purification catalyst unit.

The first aspect of the invention relates to an internal combustion engine air-fuel ratio control apparatus, having: an exhaust-gas purification catalyst unit that is provided in an exhaust passage of an internal combustion engine and has an oxygen storage capability storing oxygen in exhaust gas when the oxygen concentration in exhaust gas flowing into the exhaust-gas purification catalyst unit is excessively high and releasing oxygen stored in the exhaust gas-purification catalyst unit when the oxygen concentration in the exhaust gas is excessively low; an intake-air amount detector that detects an amount of intake air drawn into the internal combustion engine; a linear air-fuel ratio sensor that is provided upstream of the exhaust-gas purification catalyst unit and has an output characteristic that is substantially proportional to the air-fuel ratio of exhaust gas; an oxygen sensor that is provided downstream of the exhaust-gas purification catalyst unit and detects whether the air-fuel ratio of exhaust gas is rich or lean; a target air-fuel ratio controller that executes feedback control of a target air-fuel ratio of exhaust gas flowing into the exhaust-gas purification catalyst unit based on an output of the intake-air amount detector and an output of the oxygen sensor; and a fuel-injection amount controller that executes feedback control of a fuel injection amount based on an output of the linear air-fuel ratio sensor such that the air-fuel ratio of the exhaust gas flowing into the exhaust-gas purification catalyst unit equals to the target air-fuel ratio. The target air-fuel ratio controller implements a first target air-fuel ratio feedback control mode in which the target air-fuel ratio is controlled through at least proportional-integral control such that, even if the intake air amount changes, the amount by which the amount of oxygen in the exhaust-gas purification catalyst unit is corrected per unit time is maintained at a constant level. The proportional correction term for the proportional-integral control of the first target air-fuel ratio feedback control mode is multiplied by a first correction coefficient that is made smaller the larger the intake air amount, and the integral correction term for the proportional-integral control of the first target air-fuel ratio feedback control mode is multiplied by a second correction coefficient that is made larger the larger the intake air amount. Then, the target air-fuel ratio controller controls the target air-fuel ratio so as to suppress the air-fuel ratio of atmosphere in the exhaust-gas purification catalyst unit from increasing to the lean side when the intake air amount is smaller than a predetermined amount and the air-fuel ratio detected by the oxygen sensor is rich.

The second aspect of the invention relates to an air-fuel ratio control method for an internal combustion engine having an exhaust-gas purification catalyst unit that has an oxygen storage capability storing oxygen in exhaust gas when the oxygen concentration in exhaust gas flowing into the exhaust-gas purification catalyst unit is excessively high and releasing oxygen stored in the exhaust gas-purification catalyst unit when the oxygen concentration in the exhaust gas is excessively low. This the air-fuel ratio control method includes: detecting an amount of intake air drawn into the internal combustion engine; obtaining an output of a linear air-fuel ratio sensor that is provided upstream of the exhaust-gas purification catalyst unit and has an output characteristic that is substantially proportional to the air-fuel ratio of exhaust gas; obtaining an output of an oxygen sensor that is provided downstream of the exhaust-gas purification catalyst unit and detects whether the air-fuel ratio of exhaust gas is rich or lean; executing feedback control of a target air-fuel ratio of exhaust gas flowing into the exhaust-gas purification catalyst unit based on the detected intake air amount and the output of the oxygen sensor; and executing feedback control of a fuel injection amount based on the output of the linear air-fuel ratio sensor such that the air-fuel ratio of the exhaust gas flowing into the exhaust-gas purification catalyst unit equals to the target air-fuel ratio. In this air-fuel ratio control method, further, a first target air-fuel ratio feedback control mode is implemented in which the target air-fuel ratio is controlled through at least proportional-integral control such that, even if the intake air amount changes, the amount by which the amount of oxygen in the exhaust-gas purification catalyst unit is corrected per unit time is maintained at a constant level. The proportional correction term for the proportional-integral control of the first target air-fuel ratio feedback control mode is multiplied by a first correction coefficient that is made smaller the larger the intake air amount, and the integral correction term for the proportional-integral control of the first target air-fuel ratio feedback control mode is multiplied by a second correction coefficient that is made larger the larger the intake air amount. Then, the target air-fuel ratio is controlled so as to suppress the air-fuel ratio of atmosphere in the exhaust-gas purification catalyst unit from increasing to the lean side when the intake air amount is smaller than a predetermined amount and the air-fuel ratio detected by the oxygen sensor is rich.

According to the air-fuel ratio control apparatus of the first aspect of the invention and the air-fuel ratio control method of the second aspect of the invention, if the intake amount is, smaller than the predetermined amount and the air-fuel ratio detected by the oxygen sensor is rich, the target air-fuel ratio of the exhaust gas flowing into the exhaust-gas purification catalyst unit is controlled so as to suppress the air-fuel ratio of the atmosphere in the exhaust-gas purification catalyst unit from increasing to the lean side. That is, for example, in an operation state of the internal combustion engine where the intake air amount is smaller than the predetermined amount that is set to, for example, an extremely small amount, such as that obtained during idling of the internal combustion engine, and the air-fuel ratio detected by the oxygen sensor is rich, the first target air-fuel ratio feedback control mode, which is implemented in a normal operation state of the internal combustion engine, is discontinued, and then the target air-fuel ratio of the exhaust gas flowing into the exhaust-gas purification catalyst unit is controlled so as to suppress the air-fuel ratio of the atmosphere in the exhaust-gas purification catalyst unit from increasing to the lean side. In this manner, even if an operation that causes an sharp increase in the intake air amount, such as a rapid acceleration operation, is performed, the air-fuel ratio of the atmosphere in the exhaust-gas purification catalyst unit does not sharply increase to the lean side, and therefore NOx in exhaust gas can be sufficiently removed through reduction reactions at the exhaust-gas purification catalyst unit.

The above-described air-fuel ratio control apparatus and method may be such that: if the intake air amount is smaller than the predetermined amount and the air-fuel ratio detected by the oxygen sensor is rich, the first target air-fuel ratio feedback control mode is discontinued and a second target air-fuel ratio feedback control mode is implemented in which the target air-fuel ratio is controlled through at least proportional-integral control; a proportional correction term for the proportional-integral control of the second target air-fuel ratio feedback control mode is multiplied by the first correction coefficient and by a third correction coefficient that is set in accordance with the intake air amount so as to reduce the correction amount per unit time of the amount of oxygen stored in the exhaust-gas purification catalyst unit; and the integral correction term for the proportional-integral control of the second target air-fuel ratio feedback control is multiplied by the second correction coefficient.

Further, the above-described air-fuel ratio control apparatus and method may be such that: the maximum oxygen storage capacity of the exhaust-gas purification catalyst unit is detected; the amount of oxygen stored in the exhaust-gas purification catalyst unit is detected; and the ratio of the amount of oxygen stored in the exhaust-gas purification catalyst unit to the maximum oxygen storage capacity of the exhaust-gas purification catalyst unit is referenced in determining the time to discontinue the first target air-fuel ratio feedback control mode and start the second target air-fuel ratio feedback control mode after it is determined that the intake air amount is smaller than the predetermined amount and the air-fuel ratio detected by the oxygen sensor is rich.

Further, the above-described air-fuel ratio control apparatus and method may be such that: an integral value calculated by integrating a deviation of an output value of the oxygen sensor from a target value is learned; and if the intake air amount is smaller than the predetermined amount, the air-fuel ratio detected by the oxygen sensor is rich, and the learning of the integral value has been completed, the first target air-fuel ratio feedback control mode is discontinued and a stoicheiometric air-fuel ratio control mode is implemented in which the target air-fuel ratio is controlled to a stoicheiometric air-fuel ratio.

Further, the above-described air-fuel ratio control apparatus and method may be such that: the maximum oxygen storage capacity of the exhaust-gas purification catalyst unit is detected; the amount of oxygen stored in the exhaust-gas purification catalyst unit is detected; and the ratio of the amount of oxygen stored in the exhaust-gas purification catalyst unit to the maximum oxygen storage capacity of the exhaust-gas purification catalyst unit is referenced in determining the time to discontinue the first target air-fuel ratio feedback control mode and implement the stoicheiometric air-fuel ratio control mode after it is determined that the intake air amount is smaller than the predetermined amount, the air-fuel ratio detected by the oxygen sensor is rich, and the learning of the integral value has been completed.

Further, the above-described air-fuel ratio control apparatus and method may be such that: a target air-fuel ratio feedback control that controls the target air-fuel ratio through proportional-integral-differential control is executed in the first target air-fuel ratio feedback control mode; a proportional correction term and a differential correction term for the proportional-integral-differential control are each multiplied by the first correction coefficient; and an integral correction term for the proportional-integral-differential control is multiplied by the second correction coefficient.

Further, the above-described air-fuel ratio control apparatus and method may be such that: a target air-fuel ratio feedback control that controls the target air-fuel ratio through proportional-integral-differential control is executed in the second target air-fuel ratio feedback control mode; a proportional correction term for the proportional-integral-differential control of the second target air-fuel ratio feedback control mode is multiplied by the first correction coefficient and by the third correction coefficient; a differential correction term for the proportional-integral-differential control of the second target air-fuel ratio feedback control mode is multiplied by the first correction coefficient; and an integral correction term for the proportional-integral-differential control of the second target air-fuel ratio feedback control mode is multiplied by the second correction coefficient.

Further, the above-described air-fuel ratio control apparatus and method may be such that: a load rate representing the amount of air that has been newly drawn into cylinders of the internal combustion engine is detected; and the integral correction term for the first target air-fuel ratio feedback control mode and the integral correction term for the second target air-fuel ratio feedback control mode are each multiplied by a fourth correction coefficient that is made larger the higher the load rate. The load rate (KL) represents the amount of air newly drawn into the cylinders of the internal combustion engine. That is, the load rate is a parameter representing the load of the internal combustion engine that reflects the speed of the internal combustion engine, and it is expressed by, for example, the equation shown below:

$$KL\ (\%)=Mcair/((DSP/NCYL)\times pastd)\times 100$$

where "Mcair" represents the amount of air that is drawn into the cylinders of the internal combustion engine as the intake valves are opened and then closed (newly drawn air amount (g)), "DSP" represents the displacement (liter(s)) of the internal combustion engine, and "NCYL" represents the number of the cylinders of the internal combustion engine 1, and "pastd" represents the air density (approx. 1.2 g/liter) in a standard condition (1013 hPa, 25° C.).

As such, the air-fuel ratio control apparatus and the air-fuel ratio control method of the invention are incorporated and implemented in an internal combustion engine in which feedback control of the target air-fuel ratio of the exhaust gas is executed based on the output of an oxygen sensor provided downstream of an exhaust-gas purification catalyst unit and the intake air amount, the feedback control incorporating at least PI control in which the proportional correction term is multiplied by a first correction coefficient that is made smaller the larger the intake air amount and the integral correction term is multiplied by a second correction coefficient that is made larger the larger the intake air amount, whereby the amount by which the oxygen amount in the exhaust-gas purification catalyst unit is corrected per unit time is maintained at a constant level. According to the air-fuel ratio control apparatus and method of the invention, even if an operation that causes a sharp increase in the intake air amount, such as a rapid acceleration operation, is performed in a state where the intake air amount is extremely small, like during idling of the internal combustion engine, and the air-fuel ratio detected by the oxygen sensor is rich, the air-fuel ratio of the atmosphere in the exhaust-gas purification catalyst does not sharply increase to the lean side, and therefore NOx in exhaust gas can be sufficiently removed through reduction reactions at the exhaust-gas purification catalyst unit.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Figure 1:
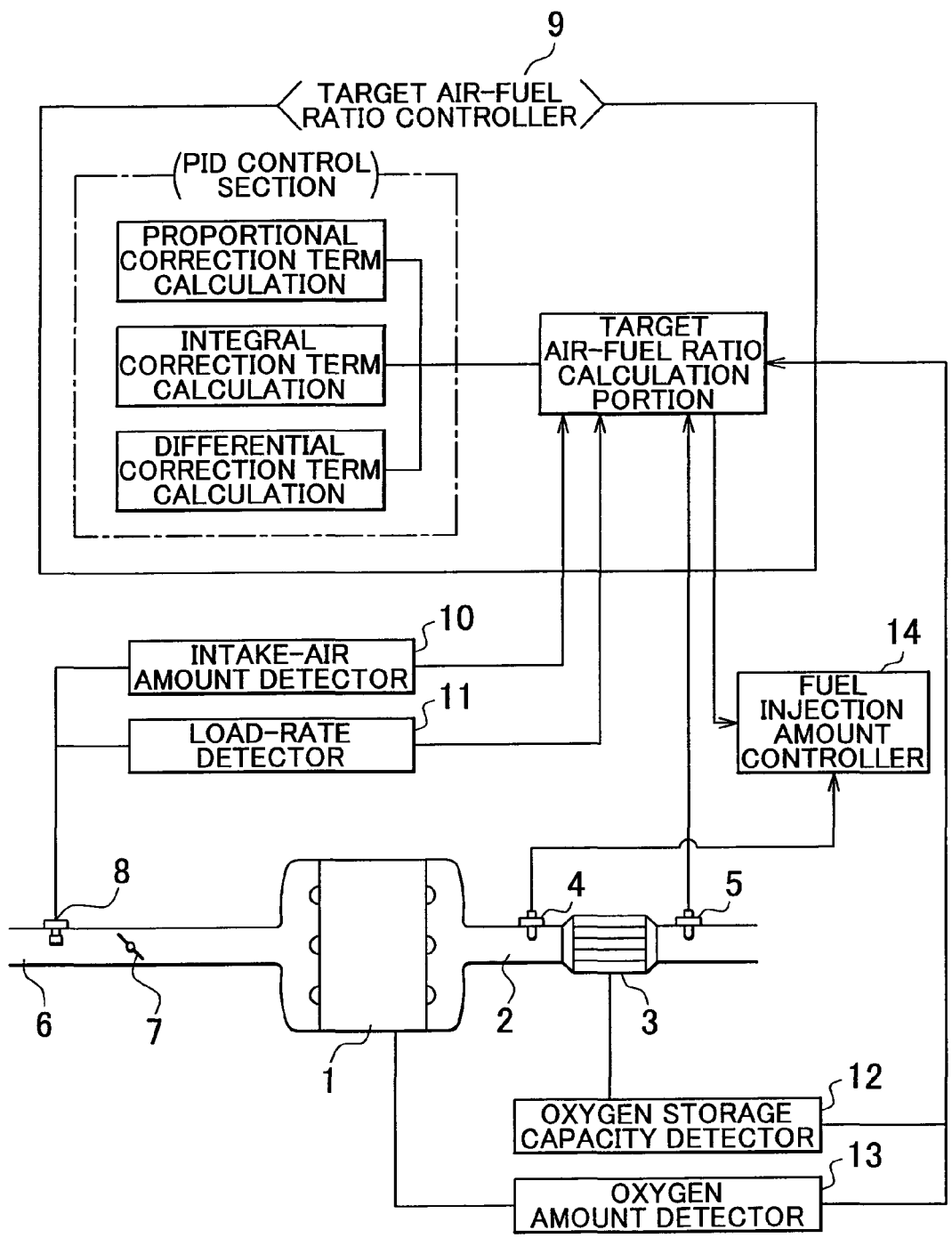
FIG. 1 is a view schematically showing the configuration of an internal combustion engine air-fuel ratio control apparatus of the first example embodiment of the invention.

Hereinafter, an internal combustion engine air-fuel ratio control apparatus according to the first example embodiment of the invention will be described with reference to the accompanying drawings. FIG. 1 schematically shows the configuration of a system incorporating the internal combustion engine air-fuel ratio control apparatus of the first example embodiment of the invention. The system shown in FIG. 1 includes an internal combustion engine 1, an exhaust pipe 2, a three-way catalyst unit 3, a linear air-fuel ratio sensor 4, an oxygen sensor 5, an intake pipe 6, a throttle valve 7, an air-flow meter 8, a target air-fuel ratio controller 9, an intake-air amount detector 10, a load rate detector 11, an oxygen storage capacity detector 12, a oxygen amount detector 13, and a fuel injection amount controller 14.

The three-way catalyst unit 3 is disposed in the exhaust pipe 2 of the internal combustion engine 1. In the exhaust pipe 2, further, the linear air-fuel ratio sensor 4 is provided upstream of the three-way catalyst unit 3, and the oxygen sensor 5 is provided downstream of the three-way catalyst unit 3. Thus, the linear air-fuel ratio sensor 4 serves as an upstream air-fuel ratio sensor, and the oxygen sensor 5 serves as a downstream air-fuel ratio sensor.

The three-way catalyst unit 3 removes NOx, HC, and CO at the maximum removal rate when the air-fuel ratio of the atmosphere in the three-way catalyst unit 3 is equal to the stoicheiometric air-fuel ratio. The three-way catalyst unit 3 stores and releases oxygen according to the air-fuel ratio of the exhaust gas flowing into the three-way catalyst unit 3. Catalytic promoters for improving the oxygen storage capacity of the three-way catalyst unit 3, such as ceria, are also supported on the carriers of the catalysts of the three-way catalyst unit 3. While a three-way catalyst unit is used as an exhaust-gas purification catalyst unit in the exhaust passage of the internal combustion engine 1 in the first example embodiment of the invention, other exhaust gas catalyst unit capable of storing and releasing oxygen may be used instead of a three-way catalyst unit.

Meanwhile, the linear air-fuel ratio sensor 4, which is provided upstream of the three-way catalyst unit 3, has an output characteristic that is substantially proportional to the air-fuel ratio of the exhaust gas. On the other hand, the oxygen sensor 5, which is provided downstream of the three-way catalyst unit 3, has an output characteristic that indicates whether the air-fuel ratio of the exhaust gas is rich or lean, that is, whether it is lower or higher than the stoicheiometric air-fuel ratio.

The throttle valve 7 and the airflow meter 8 are disposed in the intake pipe 6 of the internal combustion engine 1. The airflow meter 8 measures the amount of intake air that is adjusted by the throttle valve 7. The airflow meter 8 directly measures the intake air amount. For example, the airflow meter 8 incorporates a potentiometer and outputs analogue voltage signals that are proportional to the intake air amount.

The intake-air amount detector 10 is provided to detect the amount of intake air supplied to the internal combustion engine 1. The load rate detector 11 is provided to detect the rate of load on the internal combustion engine 1. For example, the air-flow meter 8 may be provided as a component of the intake-air amount detector 10 and as a component of the load rate detector 11, and the intake-air amount detector 10 and the load rate detector 11 may calculate the intake air amount and the load rate of the internal combustion engine 1, respectively, based on the output of the air-flow meter 8.

The load rate (KL) represents the amount of air newly drawn into the cylinders of the internal combustion engine 1. That is, the load rate is a parameter representing the load of the internal combustion engine 1 that reflects the speed of the internal combustion engine 1, and it is expressed by, for example, the equation 1 shown below:

$$KL\ (\%) = Mcair/((DSP/NCYL) \times \rho astd) \times 100 \quad \text{(Equation 1)}$$

where "Mcair" represents the amount of air that is drawn into the cylinders of the internal combustion engine 1 as the intake valves are opened and then closed (which will hereinafter be referred to as "a newly drawn air amount (g)"), "DSP" represents the displacement (liter(s)) of the internal combustion engine 1, and "NCYL" represents the number of the cylinders of the internal combustion engine 1, and "ρastd" represents the air density (approx. 1.2 g/liter) in a standard condition (1013 hPa, 25° C.). In a case where the load rate of the internal combustion engine 1 is calculated as described above, the load rate detector 11 incorporates an engine speed detector for detecting the speed of the internal combustion engine 1.

The oxygen storage capacity detector 12 is provided to detect the maximum amount of oxygen that the three-way catalyst unit 3 can store (will hereinafter be referred to as "the maximum oxygen storage capacity"). For example, the linear air-fuel ratio sensor 4, the oxygen sensor 5, and the airflow meter 8 may be provided as components of the oxygen storage capacity detector 12. In this case, the maximum oxygen storage capacity of the three-way catalyst unit 3 is calculated based on the outputs of the linear air-fuel ratio sensor 4, the oxygen sensor 5, and the air-flow meter 8. For example, the ratio of excessive or deficient oxygen (will hereinafter be referred to as "excessive-oxygen ratio") is calculated from the air-fuel ratio at the upstream side of the three-way catalyst unit 3, and the amount of oxygen that is stored to or released from the three-way catalyst unit 3 is then obtained from the calculated excessive-oxygen ratio and the present intake air amount, and the maximum oxygen storage capacity of the three-way catalyst unit 3 is calculated by accumulating the oxygen adsorption and release amounts thus obtained. Further, the oxygen amount detector 13 is provided to detect the amount of oxygen presently stored in the three-way catalyst unit 3 based on the intake air amount, the air-fuel ratio of exhaust gas, and so on.

The target air-fuel ratio controller 9 is provided to perform feedback control of the target air-fuel ratio of the exhaust gas flowing into the three-way catalyst unit 3, that is, the value of the air-fuel ratio of said exhaust gas that is suitable for maintaining the amount of oxygen stored in the three-way catalyst unit 3 (will hereinafter be referred to as "oxygen amount in the three-way catalyst unit 3" where necessary) at a desired constant level. The target air-fuel ratio controller 9 incorporates a PID (Proportional-Integral-Differential) control section that calculates the feedback correction amounts to be applied to the proportional correction term, the integral correction term, the differential correction term of PID control.

The target air-fuel ratio controller 9 further incorporates a target air-fuel ratio calculation portion. The target air-fuel ratio calculation portion obtains the outputs of the oxygen sensor 5, the intake-air amount detector 10, the load rate detector 11, the oxygen storage capacity detector 12, and the oxygen amount detector 13.

The target air-fuel ratio calculation portion of the target air-fuel ratio controller 9 has a first map and a second map. The first map is used to calculate a first correction coefficient that is multiplied by the proportional correction term and the differential correction term during the PID control. According to the first map, the first correction coefficient is calculated in accordance with the intake air amount. The second map is used to calculate a second correction coefficient that is multiplied by the integral correction term during the PID control. According to the second map, the second correction coefficient is calculated based on the load rate of the internal combustion engine 1. More specifically, the first map is formulated such that the larger the intake air amount, the smaller the first correction coefficient is made, and the second map is formulated such that the second correction coefficient is calculated in proportion to the load rate of the internal combustion engine 1. Further, the target air-fuel ratio calculation portion has a third map that is used to calculate a third correction coefficient that is used to reduce the amount by which the oxygen amount in the three-way catalyst unit 3 is corrected per unit time (will hereinafter be referred to as "the correction amount per unit time of the oxygen amount in the three-way catalyst unit 3"). According to the third map, the third correction coefficient is calculated in accordance with the intake air amount. The third correction coefficient is used in a state where the intake air amount is extremely small, such as when the internal combustion engine 1 is idling, while the air-fuel ratio detected by the oxygen sensor 5 is rich. The first to third maps are stored in a memory, or the like.

The fuel injection amount controller 14 is provided to perform feedback control of the fuel injection amount based on the output of the linear air-fuel ratio sensor 4 such that the air-fuel ratio of the exhaust gas flowing into the three-way catalyst unit 3 equals the target air fuel ratio controlled by the target air-fuel ratio controller 9. Thus, the fuel injection amount controller 14 obtains the output of the linear air-fuel ratio sensor 4 and the information on the target air-fuel ratio controlled by the target air-fuel ratio controller 9.

Figure 2A:
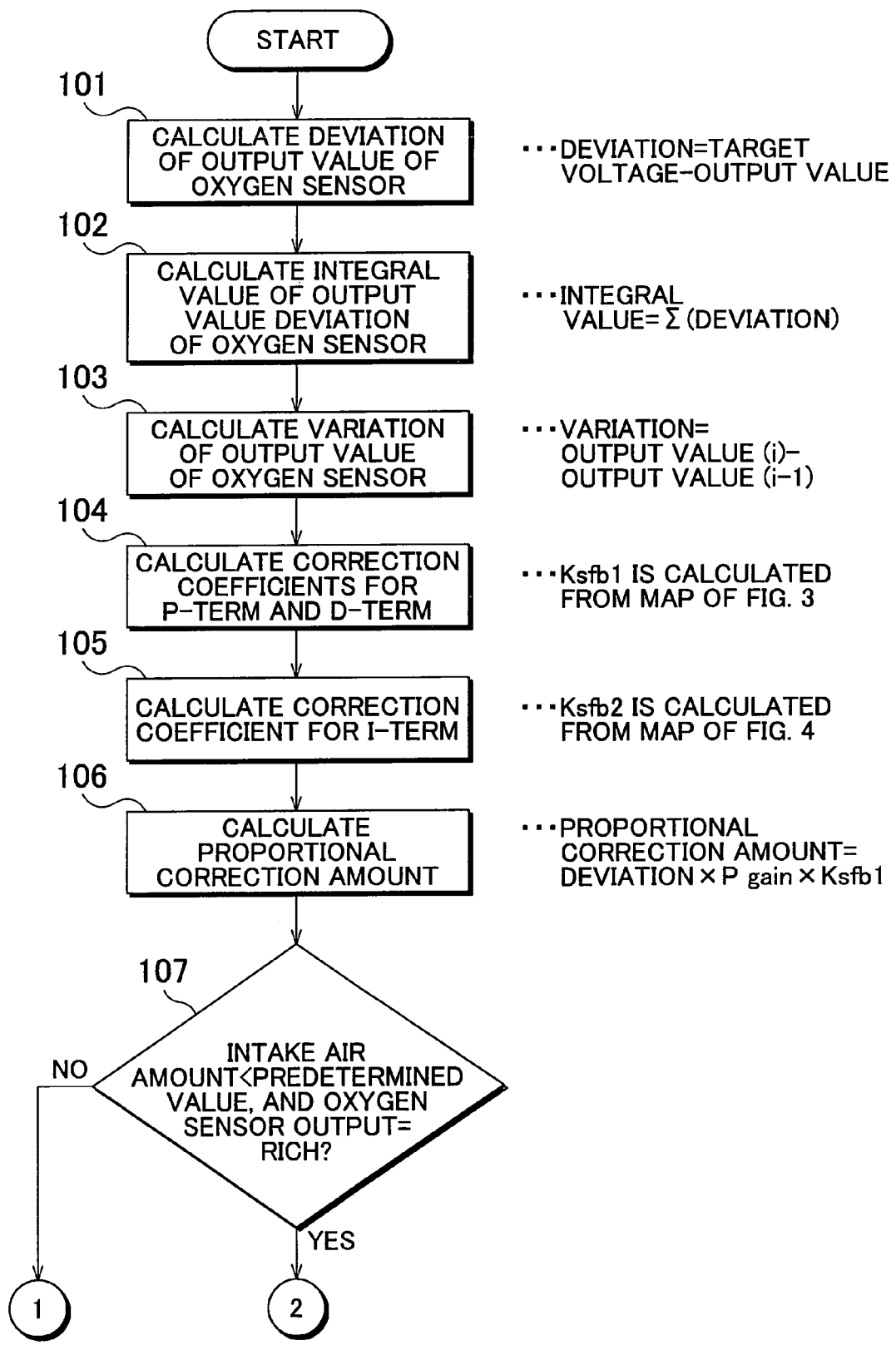
FIGS. 2A and 2B are flowcharts illustrating an example routine of PID control that is executed in the internal combustion engine incorporating the air-fuel ratio control apparatus of the first example embodiment to calculate the correction amount for the feedback control of the target air-fuel ratio of the exhaust gas flowing into the three-way catalyst unit.
Figure 2B:
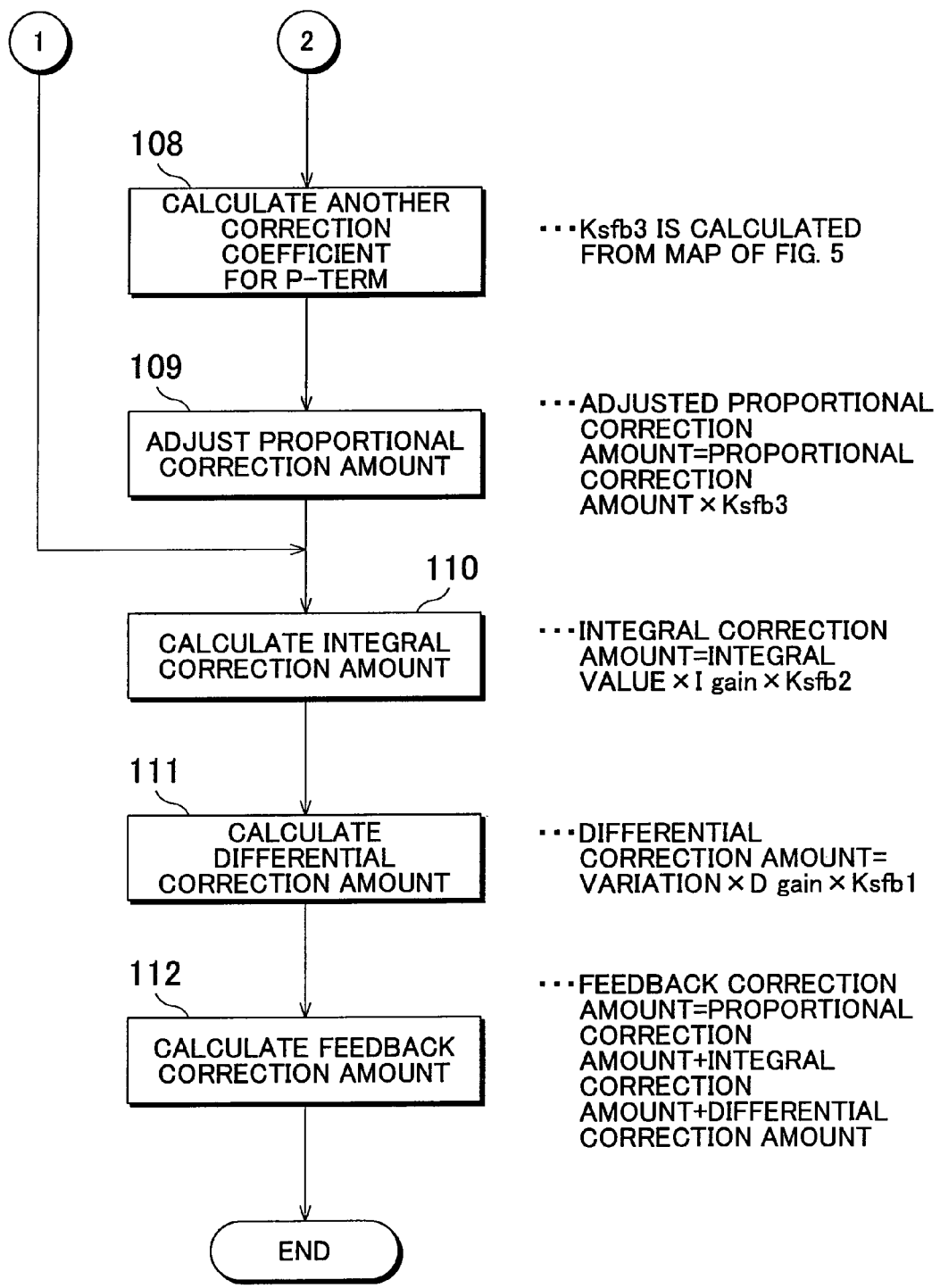

Next, the effects of the air-fuel ratio control apparatus of the first example embodiment that incorporates the foregoing components will be described. FIGS. 2A and 2B illustrate an example routine of the PID control that is executed in the internal combustion engine 1 incorporating the air-fuel ratio control apparatus of the first example embodiment to calculate the correction amount for the feedback control of the target air-fuel ratio of the exhaust gas flowing into the three-way catalyst unit 3.

In this routine, first, the target air-fuel ratio calculation portion calculates the deviation of the output value of the oxygen sensor 5, an integral value of the deviation of the output value of the oxygen sensor 5, which is obtained by integrating said deviation, and the variation of the output value of the oxygen sensor 5 based on the output of the oxygen sensor 5. Next, the first and second correction coefficients to be multiplied by the proportional correction term, the differential correction term, and the integral correction term for the PID control are calculated in accordance with the intake air amount and the load rate of the internal combustion engine 1 using the first and second maps stored in the target air-fuel ratio calculation portion. Through these calculation processes, the first and second correction coefficients are set to such values that the correction amount per unit time of the oxygen amount in the three-way catalyst unit 3 remains at a desired constant level, that is, such values that the amount of oxygen that is stored to or released from the three-way catalyst unit 3 per unit time remains at a desired constant level.

Then, it is determined whether the intake air amount is smaller than a predetermined amount that is set to an extremely small amount, such as that obtained during idling of the internal combustion engine 1, and the air-fuel ratio detected by the oxygen sensor 5 is rich. At this time, if it is determined that the intake air amount is not smaller than the predetermined amount and/or the air-fuel ratio detected by the oxygen sensor 5 is not rich, a first target air-fuel ratio feedback control mode is implemented. In the first target air-fuel ratio feedback control mode, a proportional correction amount (P), an integral correction amount (I), and the differential correction amount (D) are calculated from the correction coefficients calculated as described above and a proportional gain (will hereinafter be referred to as "P gain"), an integral gain (will hereinafter be referred to as "I gain"), and a differential gain (will hereinafter be referred to as "D gain") that have been set in advance using corresponding maps in the PID control, respectively. Then, in the first target air-fuel ratio feedback control mode, the feedback control of the target air-fuel ratio of the exhaust gas flowing into the three-way catalyst unit 3 is executed based on the proportional correction amount (P), the integral correction amount (I), and the differential correction amount (D) calculated as mentioned above.

On the other hand, if it is determined that the intake air amount is smaller than the predetermined amount that is set to an extremely small amount, such as that obtained during idling of the internal combustion engine 1, and the air-fuel ratio detected by the oxygen sensor 5 is rich, a second target air-fuel ratio feedback control mode is implemented. In the second target air-fuel ratio feedback control mode, the third correction coefficient that is additionally multiplied by the proportional correction term for the PID control is calculated using the third map stored in the target air-fuel ratio calculation portion, and the proportional correction term for the PID control is adjusted by being multiplied by the calculated third correction coefficient, whereby the correction amount per unit time of the oxygen amount in the three-way catalyst unit 3 decreases, thus suppressing the air-fuel ratio of the atmosphere in the three-way catalyst unit 3 from increasing to the lean side. Each step of this control will be described in detail below.

Referring to FIGS. 2A and 2B, first, the deviation of the output value of the oxygen sensor 5 is calculated in step 101. Then, the integral value of said deviation is calculated in step 102. Then, the variation of the output value of the oxygen sensor 5 is calculated in step 103. More specifically, in step 101, the target air-fuel ratio calculation portion of the target air-fuel ratio controller 9 calculates the deviation of the output value of the oxygen sensor 5. That is, the deviation of the output value of the oxygen sensor 5 is calculated by subtracting the output value of the oxygen sensor 5 from a target output voltage of the oxygen sensor 5 that corresponds to, for example, the stoicheiometric air-fuel ratio. In step 102, the target air-fuel ratio calculation portion of the target air-fuel ratio controller 9 calculates an accumulative value of the deviation of the output value of the oxygen sensor 5 calculated in step 101, that is, an integral value of said deviation. More specifically, said integral value is calculated by integrating the deviation of the output value of the oxygen sensor 5 calculated in step 101. In step 103, the target air-fuel ratio calculation portion of the target air-fuel ratio controller 9 calculates the variation of the output value of the oxygen sensor 5. More specifically, said variation is calculated by subtracting the last output value (i−1) from the present output value (i) of the oxygen sensor 5.

Figure 3:
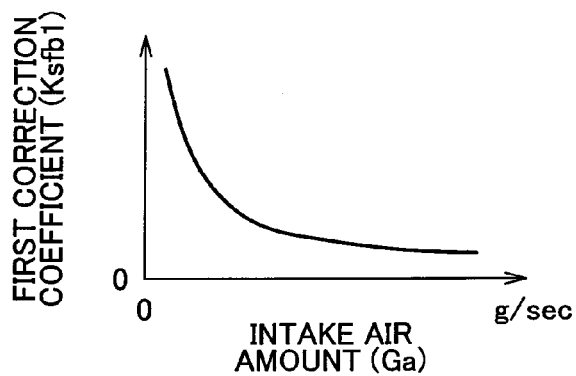
FIG. 3 is one example of the first map that is used to calculate, in accordance with the intake air amount, the first correction coefficient (Ksfb1) that is multiplied by the proportional correction term and the differential correction term in the PID control of the air-fuel ratio controller of the target air-fuel ratio control apparatus.
Figure 4:
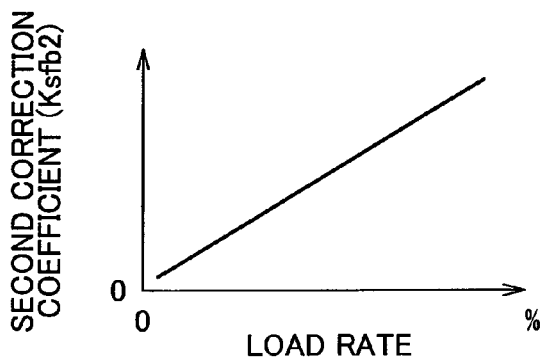
FIG. 4 is one example of the second map that is used to calculate, in accordance with the load rate of the internal combustion engine, the second correction coefficient (Ksfb2) that is multiplied by the integration term in the PID control of the target air-fuel ratio controller.

Then, in step 104 and step 105, the correction coefficients that are multiplied by the proportional correction term, the differential correction term, and the integral correction term in the PID control are calculated using the corresponding maps stored in the target air-fuel ratio calculation portion. FIG. 3 shows one example of the first map that is used to calculate, in accordance with the intake air amount, the first correction coefficient (Ksfb1) that is multiplied by the proportional correction term and the differential correction term in the PID control of the target air-fuel ratio controller 9. FIG. 4 shows one example of the second map that is used to calculate, in accordance with the load rate of the internal combustion engine 1, the second correction coefficient (Ksfb2) that is multiplied by the integration term in the PID control of the target air-fuel ratio controller 9.

In step 104, the first correction coefficient (Ksfb1), which is multiplied by the proportional correction term and the differential correction term in the PID control of the target air-fuel ratio controller 9, is calculated based on the output of the intake-air amount detector 10 and using the first map (FIG. 3) stored in the target air-fuel ratio calculation portion. As shown in FIG. 3, the first map is formulated such that the larger the intake air amount (Ga), the smaller the first correction coefficient (Ksfb1) is made.

According to the air-fuel ratio control apparatus of the first example embodiment, as described above, the feedback control of the target air-fuel ratio of the exhaust gas flowing into the three-way catalyst unit 3 is executed based on the output of the oxygen sensor 5, and the feedback control of the fuel injection amount is executed based on the output of the linear air-fuel ratio sensor 4. However, the degree of oxygen adsorption to the three-way catalyst unit 3 and the degree of oxygen release from the three-way catalyst unit 3 vary depending upon the intake air amount even if the target air-fuel ratio of the exhaust gas flowing into the three-way catalyst unit 3 is maintained at a constant level. For example, in a case where the target air-fuel ratio of the exhaust gas flowing into the three-way catalyst unit 3 is set to a lean value, that is a value higher than the stoicheiometric air-fuel ratio, the larger the intake air amount, the larger the amount of oxygen stored to the three-way catalyst unit 3 per unit time, and therefore the sooner it reaches the maximum oxygen storage capacity of the three-way catalyst unit 3 (i.e., the maximum amount of oxygen that the three-way catalyst unit 3 can store). As such, even if the target air-fuel ratio of the exhaust gas flowing into the three-way catalyst unit 3 is maintained at a constant value, the amount of oxygen that is stored to the three-way catalyst unit 3 per unit time increases as the intake air amount increases, and this may cause the oxygen amount in the three-way catalyst unit 3 to be corrected by a large amount, increasing the possibility of the atmosphere in the three-way catalyst unit 3 deviating from the purification window.

According to the air-fuel ratio control apparatus of the first example embodiment, therefore, during the PID control of the target air-fuel ratio controller 9, the first correction coefficient, which is made smaller the larger the intake air amount, is multiplied by the proportional correction term and the differential correction term for the PID control. As a result, even if the intake air amount changes, the amount of oxygen that is stored to or released from the three-way catalyst unit 3 per unit time is maintained at a constant level. That is, the correction amount per unit time of the oxygen amount in the three-way catalyst unit 3 can be maintained at a constant level, and therefore the atmosphere in the three-way catalyst unit 3 can be prevented from deviating from the target purification window, reducing the emissions of the internal combustion engine 1.

In step 105, the second correction coefficient (Ksfb2), which is multiplied by the integral correction term in the PID control of the target air-fuel ratio controller 9, is calculated using the second map (FIG. 4) stored in the target air-fuel ratio calculation portion. As shown in FIG. 4, the second correction coefficient is set in proportion to the load rate of the internal combustion engine 1 such that the higher the load rate of the internal combustion engine 1, the larger the second correction coefficient is made. Because the integral correction term for the PID control is used to correct the deviation of the actual air-fuel ratio of the exhaust gas flowing into the three-way catalyst unit 3 from the target air-fuel ratio calculated by the target air-fuel ratio controller 9, if the second correction coefficient that is multiplied by the integral correction coefficient for correction is set in proportion to the load rate of the internal combustion engine 1, the actual air-fuel ratio of the exhaust gas flowing into the three-way catalyst unit 3 can be accurately maintained at the target air-fuel ratio.

In step 106, the proportional correction amount (P) is calculated based on the values calculated in step 101 and step 104 and the P gain for the PID control. More specifically, the proportional correction amount (P) is calculated by multiplying the deviation of the output value of the oxygen sensor 5 calculated in step 101, the first correction coefficient (Ksfb1) calculated in step 104, and the P gain.

Then, in step 107, it is determined whether the intake air amount is smaller than the predetermined amount, which is set to an extremely small amount, such as that obtained during idling of the internal combustion engine 1, and the air-fuel ratio detected by the oxygen sensor 5 is rich. At this time, if it is determined that the intake air amount is smaller than the predetermined amount but the air-fuel ratio detected by the oxygen sensor 5 is not rich, the control proceeds to step 110, starting the first target air-fuel ratio feedback control mode.

In step 110 and step 111, the integral correction amount (I) and the differential correction amount (D) are calculated from the values calculated in step 102 to step 105 and the I gain and the D gain for the PID control. More specifically, in step 110, the integral correction amount (I) for the PID control of the target air-fuel ratio controller 9 is calculated by multiplying the integral value of the deviation of the output value of the oxygen sensor 5 calculated in step 102, the second correction coefficient (Ksfb2) calculated in step 105, and the I gain. In step 111, the differential correction amount (D) for the PID control of the target air-fuel ratio controller 9 is calculated by multiplying the variation of the output value of the oxygen sensor 5 calculated in step 103, the first correction coefficient (Ksfb1) calculated in step 104, and the D gain.

Then, in step 112, a feedback correction amount is calculated by summing the proportional correction amount (P), the integral correction amount (I), and the differential correction amount (D) for the PID control of the target air-fuel ratio controller 9, which were calculated in step 106, step 110, and step 111, respectively. After this calculation of the feedback correction amount, the control routine is finished.

On the other hand, it is determined in step 107 that the intake air amount is smaller than the predetermined amount and the air-fuel ratio detected by the oxygen sensor 5 is rich, the control proceeds to step 108, starting the second target air-fuel ratio feedback control mode.

Figure 5:
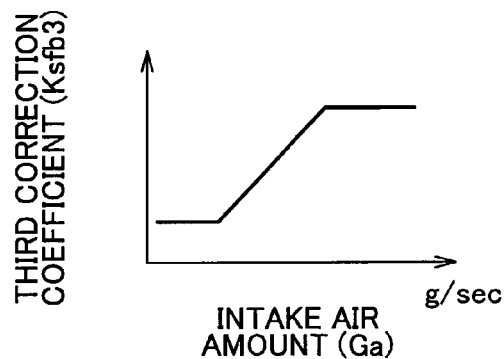
FIG. 5 is one example of the third map that is used to calculate, in accordance with the intake air amount, the third correction coefficient (Ksfb3) that is multiplied by the proportional correction term in order to reduce the correction amount per unit time of the oxygen amount in the three-way catalyst unit 3 in the PID control of the target air-fuel ratio controller.

In step 108, the third correction coefficient (Ksfb3) that is multiplied by the proportional correction term for the PID control is calculated in accordance with the intake air amount using the third map (FIG. 5) stored in the target air-fuel ratio calculation portion. Then, in step 109, the proportional correction amount (P) calculated in step 106 is adjusted by being multiplied by the third correction coefficient (Ksfb3). Then, the integral correction amount (I) is calculated in step 110, and then the differential correction amount (D) is calculated in step 111. Then, in step 112, the feedback correction amount is calculated by summing the proportional correction amount (P) calculated in step 106 and then adjusted in step 109, the integral correction amount (I) calculated in step 110, and the differential correction amount (D) calculated in step 111. After this calculation of the feedback correction amount, the control routine is finished. FIG. 5 illustrates one example of the third map that is used to calculate, in accordance with the intake air amount, the third correction coefficient (Ksfb3) that is multiplied by the proportional correction term in order to reduce the correction amount per unit time of the oxygen amount in the three-way catalyst unit 3 in the PID control of the target air-fuel ratio controller 9. Referring to FIG. 5, the third correction coefficient, which is multiplied by the proportional correction term for the PID control, is generally made smaller the smaller the intake air amount. Using the third correction coefficient thus set, the second target air-fuel ratio feedback control mode properly suppresses the air-fuel ratio of the atmosphere in the three-way catalyst unit 3 from increasing to the lean side even when an operation that causes a sharp increase in the intake air amount is performed (e.g., an rapid acceleration operation) in a state where the intake air amount is extremely small (e.g., when the internal combustion engine 1 is idling) and the air-fuel ratio detected by the oxygen sensor 5 is rich, ensuring that the three-way catalyst unit 3 sufficiently removes NOx contained in the exhaust gas.

After the end of the control routine of FIGS. 2A and 2B, the fuel injection amount controller 14 performs the feedback control of the fuel injection amount based on the information on the air-fuel ratio of the exhaust gas flowing into the three-way catalyst unit 3 that is detected by the linear air-fuel ratio sensor 4 such that the air-fuel ratio of said exhaust gas equals the target air-fuel ratio that has been controlled through the feedback control based on the feedback correction amount calculated in step 112.

While the feedback correction amount of the target air-fuel ratio of the exhaust gas flowing into the three-way catalyst unit 3 is calculated through PID control in the above-described control routine that is executed by the air-fuel ratio control apparatus of the first example embodiment in the internal combustion engine 1 shown in FIG. 1, even if PI (Proportion-Integration) control not including D (Differential) control is executed in place of the PID control, the correction amount of the oxygen amount in an exhaust-gas purification catalyst having an oxygen storage capability, such as the three-way catalyst unit 3, can be maintained at a constant level despite changes in the intake air amount. That is, if appropriate, the feedback correction amount of the target air-fuel ratio of the exhaust gas flowing into the three-way catalyst unit 3 may be calculated through PI control instead of PID control. In this case, the steps related to the differential correction term are removed from the control routine illustrated in FIGS. 2A and 2B.

As mentioned above, the amount of air that is newly drawn into the cylinders as the intake valves are opened and then closed varies depending upon the engine speed, the number of the cylinders, and so on, as well as the intake air amount. In view of this, as described above, in the control routine shown in FIGS. 2A and 2B that incorporates PID control for calculating the feedback correction amount of the target air-fuel ratio of the exhaust gas flowing into the three-way catalyst unit 3, for the purpose of improving the accuracy of the feedback control of said target air-fuel ratio, a correction coefficient is used which is made larger the higher the load rate of the internal combustion engine 1 that represents the amount of air that is newly drawn to the cylinders as the intake valves are opened and then closed, and said correction coefficient is multiplied by the integral correction term. However, the integral correction term may be corrected by being multiplied by a correction coefficient that is made larger the larger the intake amount instead of the correction coefficient that is set according to the load rate of the internal combustion engine 1 as mentioned above. In this case, too, the correction amount of the oxygen amount in an exhaust-gas purification catalyst having an oxygen storage capability, such as the three-way catalyst unit 3, can be maintained at a constant level despite changes in the intake air amount. Therefore, the correction coefficient for correcting the integral correction term may be set in accordance with the intake amount. In this case, the integral correction term is multiplied by a correction coefficient that is made larger the larger the intake air amount, not the foregoing correction coefficient that is made larger the higher the load rate of the internal combustion engine 1, in the control routine shown in FIGS. 2A and 2B, and therefore it is not necessary to provide the load rate detector 11.

According to the control routine illustrated in FIGS. 2A and 2B, as described above, the proportional correction amount (P) is adjusted and the second target air-fuel ratio control mode for suppressing the air-fuel ratio of the atmosphere in the three-way catalyst unit 3 from increasing to the lean side is started immediately after it is determined in step 107 that the intake air amount is smaller than the predetermined amount, which is set to an extremely small amount, such as that obtained during idling of the internal combustion engine 1, and the air-fuel ratio detected by the oxygen sensor 5 is rich. However, the time to start the second target air-fuel ratio control mode may be determined based on the ratio of the oxygen amount in the three-way catalyst unit 3 to the maximum oxygen storage capacity of the three-way catalyst unit 3. For example, during operation of the internal combustion engine 1, if the oxygen amount in the three-way catalyst unit 3 becomes approximately 50% of the maximum oxygen storage capacity of the three-way catalyst unit 3 in a state where the target air-fuel ratio of the exhaust gas flowing into the three-way catalyst unit 3 has continuously been lean while the intake air amount is smaller than the predetermined amount, which is set to an extremely small amount, such as that obtained during idling of the internal combustion engine 1, and the air-fuel ratio detected by the oxygen sensor 5 is rich, it may be determined that the remaining oxygen storage capacity of the three-way catalyst unit 3 is not large enough to sufficiently remove NOx in exhaust gas through reduction reactions when a rapid acceleration operation is performed and the amount of NOx in exhaust gas thereby increases. In this case, therefore, the second target air-fuel ratio feedback control mode may be started when the determination as to the remaining oxygen storage capacity of the three-way catalyst unit 3 is made.

Further, the time to finish the second target air-fuel ratio feedback control mode may be determined based on the ratio of the oxygen amount in the three-way catalyst unit 3 to the maximum oxygen storage capacity of the three-way catalyst unit 3. For example, the second target air-fuel ratio feedback control mode is finished when the oxygen amount in the three-way catalyst unit 3 becomes approximately 80% of the maximum oxygen storage capacity of the three-way catalyst unit 3, and then the control for making the target air-fuel ratio of the exhaust gas flowing into the three-way catalyst unit 3 rich is executed.

The maximum oxygen storage capacity of an exhaust-gas purification catalyst unit changes according to the state of degradation of said unit. Thus, the larger the degree of degradation of the exhaust-gas purification catalyst unit, the smaller its maximum oxygen storage capacity. Therefore, the ratio of the oxygen amount in the three-way catalyst unit 3 to the maximum oxygen storage capacity that is referenced in determining the time at which to finish the second target air-fuel ratio feedback control mode is set in consideration of the maximum oxygen storage capacity of the three-way catalyst unit 3 that changes depending upon the degree of degradation of the three-way catalyst unit 3.

Figure 6:
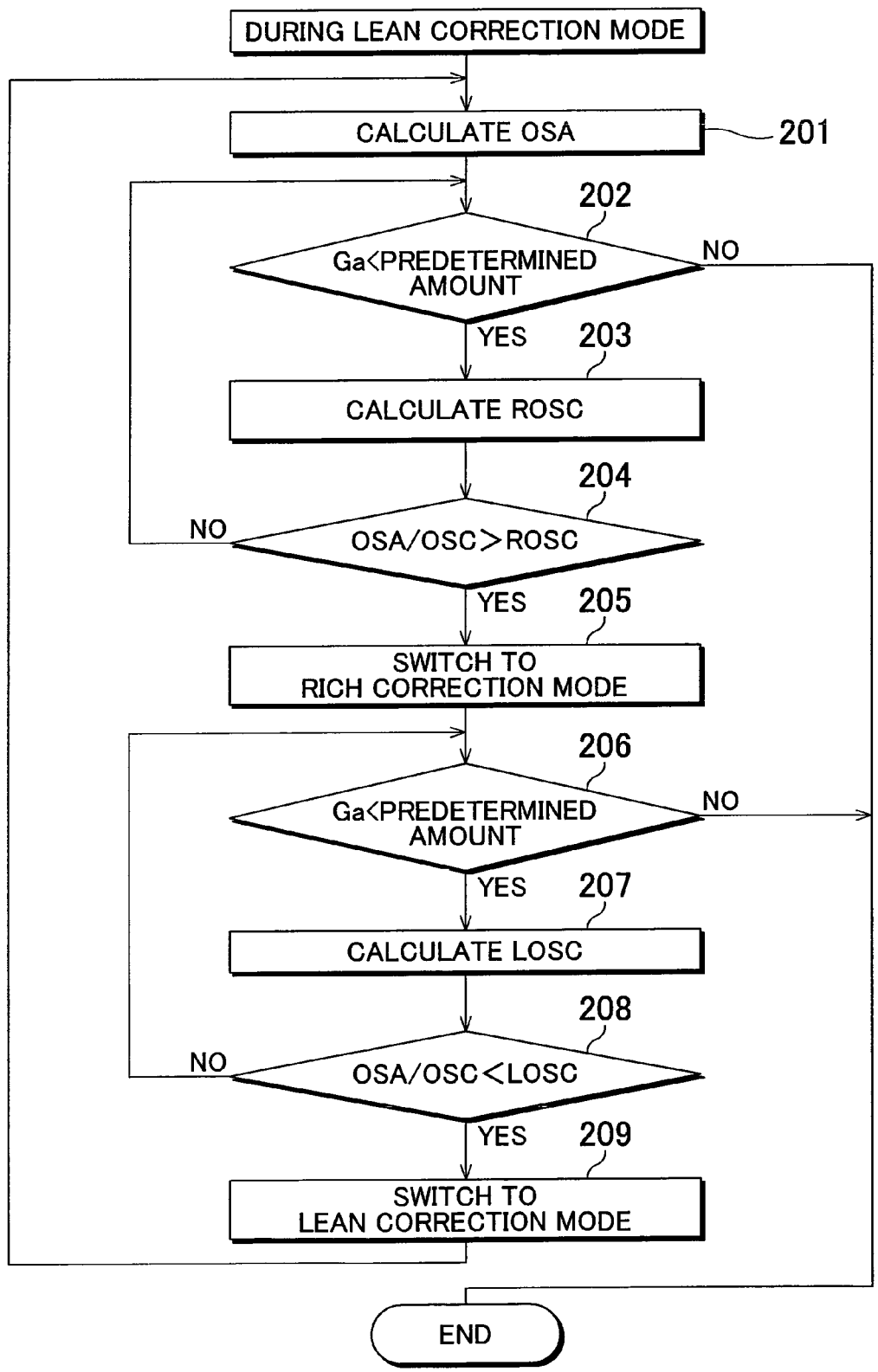
FIG. 6 is a flowchart illustrating an example of a control routine that controls the time to switch the target air-fuel ratio of the exhaust gas flowing into the three-way catalyst unit to rich or to lean based on the ratio of the oxygen amount in the three-way catalyst unit to the maximum oxygen storage capacity of the three-way catalyst unit.

FIG. 6 shows an example of a control routine that controls the time to switch the target air-fuel ratio of the exhaust gas flowing into the three-way catalyst unit 3 to rich or to lean based on the ratio of the oxygen amount in the three-way catalyst unit 3 to the maximum oxygen storage capacity of the three-way catalyst unit 3.

According to the example control routine illustrated in FIG. 6, step 201 is first performed during execution of a lean correction mode in which the target air-fuel ratio of the exhaust gas flowing into the three-way catalyst unit 3 is controlled to lean. In step 201, the oxygen amount (OSA) of the three-way catalyst unit is calculated. Then, in step 202, it is determined whether the intake air amount (Ga) is smaller than the predetermine amount that is set to an extremely small amount, such as that obtained during idling of the internal combustion engine 1. If it is determined in this step that the intake air amount (Ga) is smaller than the predetermined amount, step 203 to step 205 are then executed. In step 203, a threshold (ROSC) for the ratio of the oxygen amount (OSA) to the maximum oxygen storage capacity (OSC) of the three-way catalyst unit 3 is calculated using a predetermined map, for example. The threshold (ROSC) is referenced when determining whether to switch the correction mode from the lean correction mode to a rich correction mode in which the target air-fuel ratio of the exhaust gas flowing into the three-way catalyst unit 3 is controlled to rich. Then, in step 204, it is determined whether the ratio of the oxygen amount (OSA) to the maximum oxygen storage capacity (OSC) of the three-way catalyst unit 3 is higher than the threshold (ROSC). If it is determined in this step that said ratio is higher than the threshold (ROSC), the correction mode is switched from the lean correction mode to the rich correction mode.

Then, in step 206, it is determined whether the intake air amount is smaller than the predetermined amount that is set to an extremely small amount, such as that obtained during idling of the internal combustion engine 1. If it is determined in step 206 that the intake air amount is smaller than the predetermined amount, step 207 to step 209 are then executed. In step 207, a threshold (LOSC) for the ratio of the oxygen amount (OSA) to the maximum oxygen storage capacity (OSC) of the three-way catalyst unit 3 is calculated using a predetermined map, for example. The threshold (LOSC) is referenced when determining whether to switch the correction mode from the rich correction mode to the lean correction mode. Then, in step 208, it is determined whether the ratio of the oxygen amount (OSA) of the three-way catalyst unit 3 to the maximum oxygen storage capacity (OSC) of the three-way catalyst unit 3 is lower than the threshold (LOSC). If it is determined in this step that said ratio is lower than the threshold (LOSC), the correction mode is switched from the rich correction mode to the lean correction mode. The foregoing processes of step 201 to step 209 are repeated until the intake air amount exceeds the predetermined amount. Thus, the control routine is finished when the intake air amount exceeds the predetermined amount.

In this example embodiment of the invention, the threshold (ROSC) that is used to determine whether to switch the correction mode from the lean correction more to the rich correction mode is set to approximately 80% of the maximum oxygen storage capacity (OSC) of the three-way catalyst unit 3, and the threshold (LOSC) that is used to determine whether to switch the correction mode from the rich correction mode to the rich correction mode is set to approximately 20% of the maximum oxygen storage capacity (OSC) of the three-way catalyst unit 3. According to the control illustrated in FIG. 6, as such, even in a state where the intake air amount is extremely small, such as when the internal combustion engine 1 is idling, NOx in exhaust gas can be sufficiently removed through reduction reactions, and HC and CO in exhaust gas can be sufficiently removed through oxidization reactions.

Figure 7:
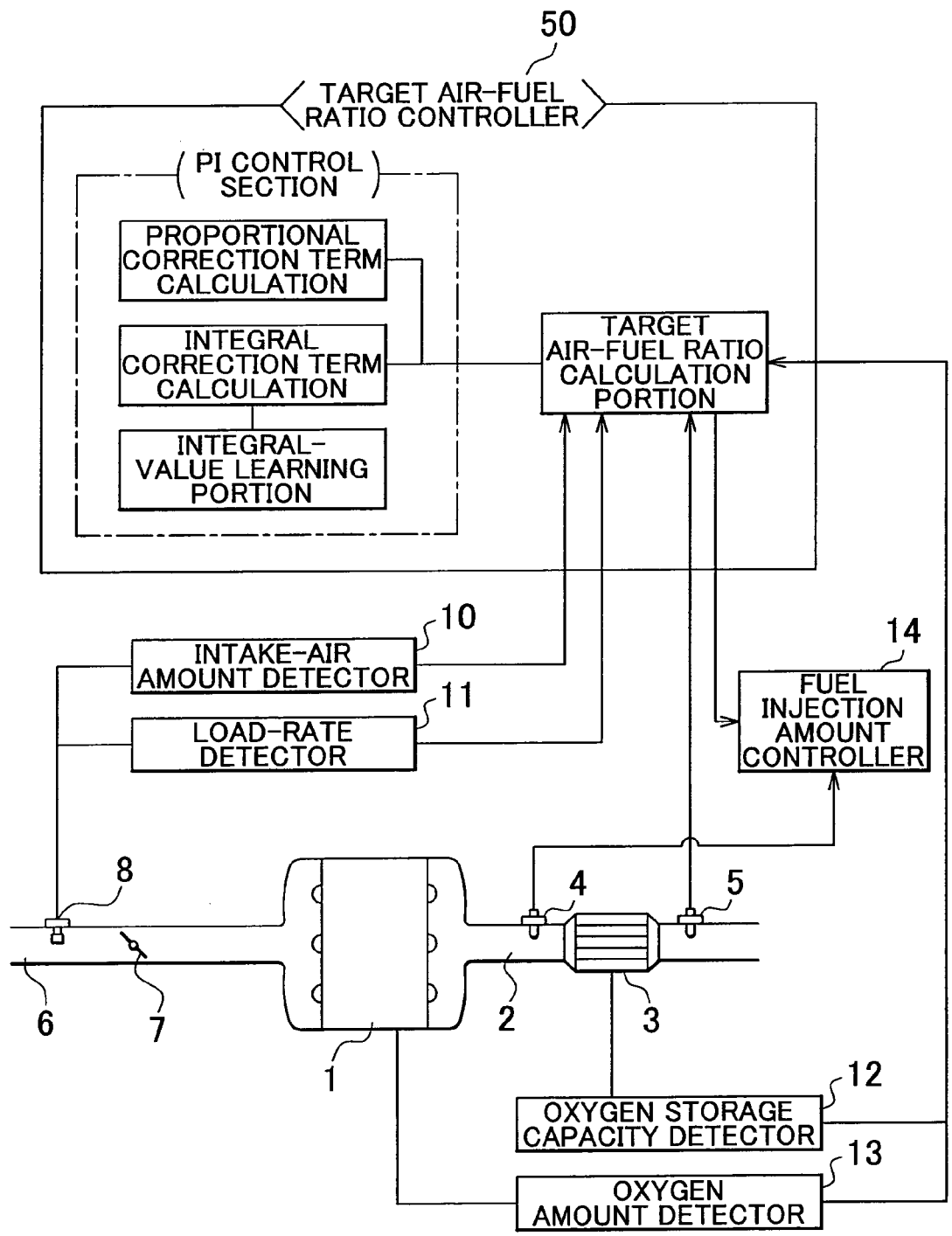
FIG. 7 is a view schematically showing the configuration of an air-fuel ratio control apparatus according to the second example embodiment of the invention.
Figure 8:
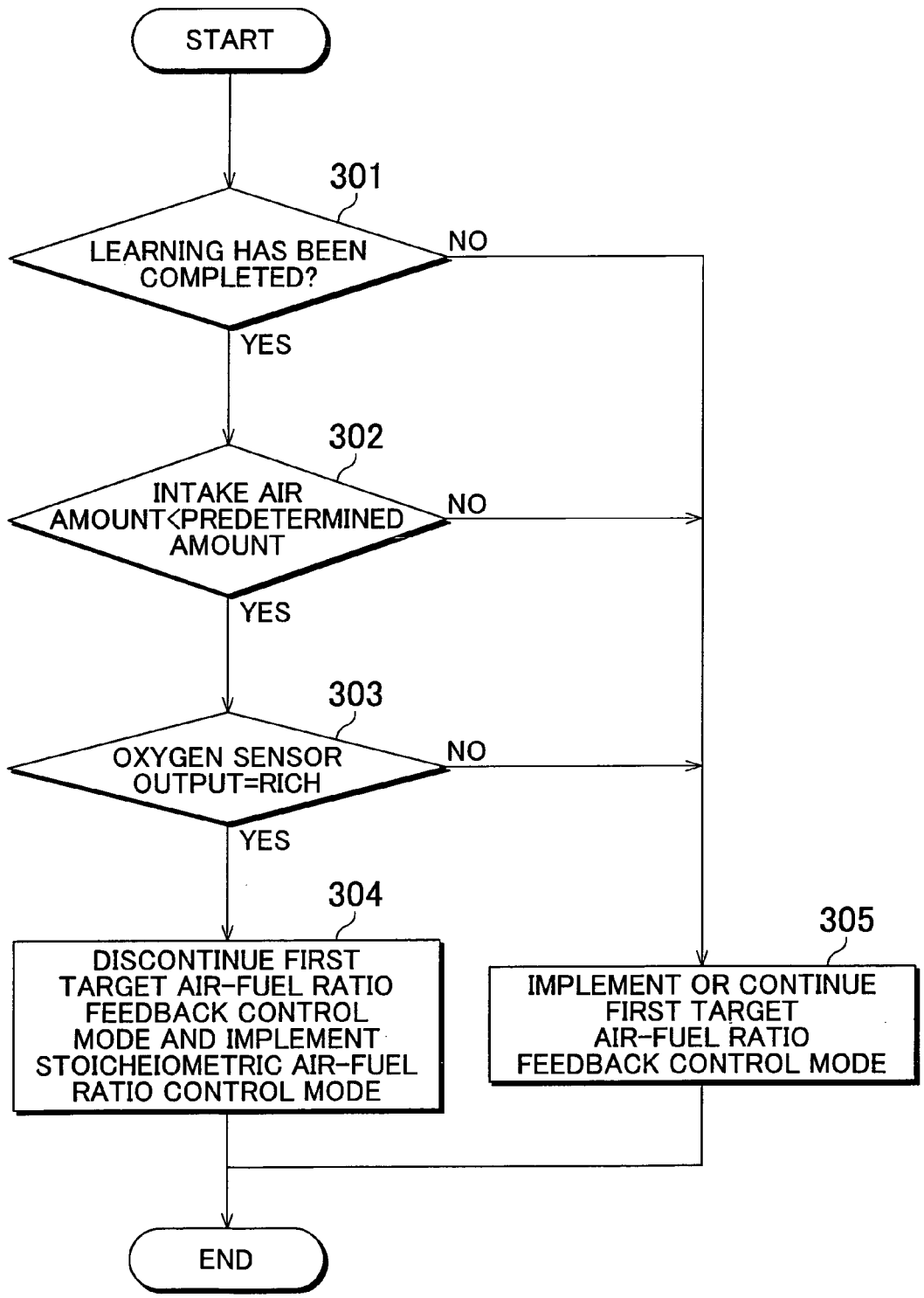
FIG. 8 is a flowchart illustrating a routine of feedback control of the target air-fuel ratio of the exhaust gas flowing into the three-way catalyst unit, which is executed in an internal combustion engine incorporating the air-fuel ratio control apparatus of the second example embodiment of the invention.

Hereinafter, the second example embodiment of the invention will be described. FIG. 7 schematically shows the configuration of an air-fuel ratio control apparatus according to the second example embodiment of the invention. The flowchart of FIG. 8 illustrates a routine of feedback control of the target air-fuel ratio of the exhaust gas flowing into the three-way catalyst unit 3. This routine is executed in an internal combustion engine incorporating the air-fuel ratio control apparatus of the second example embodiment of the invention.

Referring to FIG. 7, a target air-fuel ratio calculation portion of a target air-fuel ratio controller 50 is constituted of a PI control section not including any sub-section for differential control, unlike the air-fuel ratio control apparatus shown in FIG. 1. The target air-fuel ratio calculation portion of the target air-fuel ratio controller 50 also has an integral-value learning portion that performs learning of the integral value of the deviation of the output value of the oxygen sensor 5. That is, the integral-value learning portion learning control for the integral correction term for the PI control of the target air-fuel ratio controller 50, and this reduces the calculation load of the feedback control and thereby improves the accuracy of the feedback control. Other components and elements of the air-fuel ratio control apparatus of the second example embodiment are the same as those of the air-fuel ratio control apparatus of the first example embodiment and therefore they are denoted by the same reference numerals. Further, while the target air-fuel ratio control portion of the target air-fuel ratio controller 50 shown in FIG. 7 is constituted of the PI control section that does not include any sub-section for differential control, it may alternatively be constituted of a PID control section as in the first example embodiment shown in FIGS. 2A and 2B.

Meanwhile, in a state where the intake air amount is smaller than a predetermined amount that is set to an extremely small amount, such as that obtained during idling of the internal combustion engine 1, and the air-fuel ratio detected by the oxygen sensor 5 is rich, in order to suppress the air-fuel ratio of the atmosphere in the three-way catalyst unit 3 from increasing to the lean side, the target air-fuel ratio controller 50 may discontinue the target air-fuel ratio feedback control and then set the target air-fuel ratio of the exhaust gas flowing into the three-way catalyst unit 3 to the stoicheiometric air-fuel ratio. According to this control, even if the air-fuel ratio detected by the oxygen sensor 5 is rich, the target air-fuel ratio of the exhaust gas flowing into the three-way catalyst unit 3 is continuously controlled to the stoicheiometric air-fuel ratio, rather than being increased (changed toward the lean side). This control suppresses the air-fuel ratio of the atmosphere in the three-way catalyst unit 3 from increasing to the lean side, ensuring sufficient removal of NOx in exhaust gas through reduction reactions.

However, in a case where the foregoing learning control is executed in the target air-fuel ratio feedback control, if the target air-fuel ratio control by the target air-fuel ratio controller 50 is discontinued before the learning has been completed, it may result in learning of an inappropriate value. Such inappropriate learning may cause deviation of the stoicheiometric point of the three-way catalyst unit 3, and this adversely affects the calculation load and the accuracy of the target air-fuel ratio feedback control when said control is later resumed.

In view of the above, in the control routine of FIG. 8, the target air-fuel ratio controller 50 discontinues the first target air-fuel ratio control mode (i.e., a target air-fuel ratio control mode in which the correction amount per unit time of the oxygen amount in the three-way catalyst unit 3 is maintained at a constant level, such as the one executed by the target air-fuel ratio control apparatus of the first example embodiment in the control routine shown in FIGS. 2A and 2B) if the learning by the integral-value learning portion has been completed in a state where the intake air amount is smaller than the predetermined value (an extremely small amount, such as that obtained during idling of the internal combustion engine 1) and the air-fuel ratio detected by the oxygen sensor 5 is rich. Then, the target air-fuel ratio controller 50 implements a stoicheiometric air-fuel ratio control mode in which the target air-fuel ratio of the exhaust gas flowing into the three-way catalyst unit 3 is controlled to the stoicheiometric air-fuel ratio. Then, the fuel injection amount controller 14 performs the feedback control of the fuel injection amount based on the output of the linear air-fuel ratio sensor 4 such that the air-fuel ratio of the exhaust gas flowing into the three-way catalyst unit 3 equals the stoicheiometric air-fuel ratio. Note that the target air-fuel ratio controller 50 continues the first target air-fuel ratio feedback control mode (i.e., a target air-fuel ratio control mode in which the correction amount per unit time of the oxygen amount in the three-way catalyst unit 3 is maintained at a constant level, such as the one executed by the target air-fuel ratio control apparatus of the first example embodiment in the control routine shown in FIGS. 2A and 2B) unless the learning by the integral-value learning portion has been completed in a state where the intake air amount is smaller than the predetermined value (an extremely small amount, such as that obtained during idling of the internal combustion engine 1) and the air-fuel ratio detected by the oxygen sensor 5 is rich.

In the routine illustrated in FIG. 8, it is first determined in step 301 whether the learning by the integral-value learning portion has been completed, and then it is determined in step 302 whether the intake air amount is smaller than a predetermined amount that is set to an extremely small amount, such as that obtained during idling of the internal combustion engine 1, and then it is determined in step 303 whether the air-fuel ratio detected by the oxygen sensor 5 is rich. If it is determined through these steps that the learning by the integral-value learning portion has been completed, the intake air amount is smaller than the predetermined amount, and the air-fuel ratio detected by the oxygen sensor 5 is rich, the target air-fuel ratio controller 50 discontinues the first target air-fuel ratio feedback control mode and then implements the stoicheiometric air-fuel ratio control mode in which the target air-fuel ratio of the exhaust gas flowing into the three-way catalyst unit 3 is controlled to the stoicheiometric air-fuel ratio. Then, the fuel injection amount controller 14 executes the feedback control of the fuel injection amount based on the output of the linear air-fuel ratio sensor 4 such that the air-fuel ratio of the exhaust gas flowing into the three-way catalyst unit 3 equals the stoicheiometric air-fuel ratio. Meanwhile, the control proceeds to step 305 unless it is determined through steps 301 to 303 that the learning by the integral-value learning portion has been completed, the intake air amount is smaller than the predetermined amount, and the air-fuel ratio detected by the oxygen sensor 5 is rich. In step 305, the target air-fuel ratio controller 50 implements the first target air-fuel ratio feedback control mode in which the correction amount per unit time of the oxygen amount in the three-way catalyst unit 3 is maintained at a constant level, such as the one executed by the target air-fuel ratio control apparatus of the first example embodiment in the control routine shown in FIGS. 2A and 2B.

In the control routine shown in FIG. 8, if it is determined through step 301 to step 303 that the learning by the integral-value learning portion has been completed, the intake air amount is smaller than the predetermined amount (i.e., an extremely small amount, such as that obtained during idling of the internal combustion engine 1), and the air-fuel ratio detected by the oxygen sensor 5 is rich, the first target air-fuel ratio feedback control mode is immediately discontinued, and then the stoicheiometric air-fuel ratio control mode is started. However, the time to start the stoicheiometric air-fuel ratio control mode may be determined based on the ratio of the oxygen amount in the three-way catalyst unit 3 to the maximum oxygen storage capacity thereof. For example, during operation of the internal combustion engine 1, if the oxygen amount in the three-way catalyst unit 3 becomes approximately 50% of the maximum oxygen storage capacity of the three-way catalyst unit 3 in a state where the target air-fuel ratio of the exhaust gas flowing into the three-way catalyst unit 3 has continuously been lean while the learning by the integral-value learning portion has been completed, the intake air amount is smaller than the predetermined amount (an extremely small amount, such as that obtained during idling of the internal combustion engine 1), and the air-fuel ratio detected by the oxygen sensor 5 is rich, it may be determined that the remaining oxygen storage capacity of the three-way catalyst unit 3 is not large enough to sufficiently remove NOx in exhaust gas through reduction reactions when a rapid acceleration operation is performed and the amount of NOx in exhaust gas thereby increases. In this case, therefore, the first target air-fuel ratio feedback control mode may be discontinued and the stoicheiometric air-fuel ratio control mode (the control mode in which the target air-fuel ratio of the exhaust gas flowing into the three-way catalyst unit 3 is controlled to the stoicheiometric air-fuel ratio) may be started immediately after the above-described determination as to the remaining oxygen storage capacity of the three-way catalyst unit 3 is made.

Further, the time to finish the stoicheiometric air-fuel ratio control mode may be determined based on the ratio of the oxygen amount in the three-way catalyst unit 3 to the maximum oxygen storage capacity of the three-way catalyst unit 3. For example, the stoicheiometric air-fuel ratio is finished when the oxygen amount in the three-way catalyst unit 3 becomes approximately 80% of the maximum oxygen storage capacity of the three-way catalyst unit 3, and then the control for making the target air-fuel ratio of the exhaust gas flowing into the three-way catalyst unit 3 rich is executed.

The maximum oxygen storage capacity of an exhaust-gas purification catalyst unit changes according to the state of degradation of said catalyst. Thus, the larger the degree of degradation of the exhaust-gas purification catalyst, the smaller its maximum oxygen storage capacity. Therefore, the ratio of the oxygen amount in the three-way catalyst unit 3 to the maximum oxygen storage capacity that is referenced in determining the time to start or finish the stoicheiometric air-fuel ratio control mode is set in consideration of the maximum oxygen storage capacity of the three-way catalyst unit 3 that changes depending upon the degree of degradation of the three-way catalyst unit 3.

The invention claimed is:

1. An internal combustion engine air-fuel ratio control apparatus, comprising:

an exhaust-gas purification catalyst unit that is provided in an exhaust passage of an internal combustion engine and has an oxygen storage capability storing oxygen in exhaust gas when the oxygen concentration in exhaust gas flowing into the exhaust-gas purification catalyst unit is excessively high and releasing oxygen stored in the exhaust gas-purification catalyst unit when the oxygen concentration in the exhaust gas is excessively low;

an intake-air amount detector that detects an amount of intake air drawn into the internal combustion engine;

a linear air-fuel ratio sensor that is provided upstream of the exhaust-gas purification catalyst unit and has an output characteristic that is substantially proportional to the air-fuel ratio of exhaust gas;

an oxygen sensor that is provided downstream of the exhaust-gas purification catalyst unit and detects whether the air-fuel ratio of exhaust gas is rich or lean;

a target air-fuel ratio controller that executes feedback control of a target air-fuel ratio of exhaust gas flowing into the exhaust-gas purification catalyst unit based on an output of the intake-air amount detector and an output of the oxygen sensor; and a fuel-injection amount controller that executes feedback control of a fuel injection amount based on an output of the linear air-fuel ratio sensor such that the air-fuel ratio of the exhaust gas flowing into the exhaust-gas purification catalyst unit equals to the target air-fuel ratio, wherein the target air-fuel ratio controller implements a first target air-fuel ratio feedback control mode in which the target air-fuel ratio is controlled through at least proportional-integral control such that, even if the intake air amount changes, the amount by which the amount of oxygen in the exhaust-gas purification catalyst unit is corrected per unit time is maintained at a constant level, a proportional correction term for the proportional-integral control of the first target air-fuel ratio feedback control mode is multiplied by a first correction coefficient that is made smaller the larger the intake air amount;

an integral correction term for the proportional-integral control of the first target air-fuel ratio feedback control mode is multiplied by a second correction coefficient that is made larger the larger the intake air amount, and the target air-fuel ratio controller controls the target air-fuel ratio so as to suppress an increase in the air-fuel ratio of atmosphere in the exhaust-gas purification catalyst unit when the intake air amount is smaller than a predetermined amount and the air-fuel ratio detected by the oxygen sensor is rich.

2. The internal combustion engine air-fuel ratio control apparatus according to claim 1, wherein:

if the intake air amount is smaller than the predetermined amount and the air-fuel ratio detected by the oxygen sensor is rich, the target air-fuel ratio controller discontinues the first target air-fuel ratio feedback control mode and implements a second target air-fuel ratio feedback control mode in which the target air-fuel ratio is controlled through at least proportional-integral control;

a proportional correction term for the proportional-integral control of the second target air-fuel ratio feedback control mode is multiplied by the first correction coefficient and by a third correction coefficient that is set in accordance with the intake air amount so as to reduce the correction amount per unit time of the amount of oxygen stored in the exhaust-gas purification catalyst unit; and an integral correction term for the proportional-integral control of the second target air-fuel ratio feedback control mode is multiplied by the second correction coefficient.

3. The internal combustion engine air-fuel ratio control apparatus according to claim 2, further comprising:

an oxygen storage capacity detector that detects the maximum oxygen storage capacity of the exhaust-gas purification catalyst unit; and an oxygen amount detector that detects the amount of oxygen stored in the exhaust-gas purification catalyst unit, wherein the target air-fuel ratio controller references the ratio of the amount of oxygen stored in the exhaust-gas purification catalyst unit to the maximum oxygen storage capacity of the exhaust-gas purification catalyst unit in determining the time to discontinue the first target air-fuel ratio feedback control mode and start the second target air-fuel ratio feedback control mode after it is determined that the intake air amount is smaller than the predetermined amount and the air-fuel ratio detected by the oxygen sensor is rich.

4. The internal combustion engine air-fuel ratio control apparatus according to claim 2, wherein a target air-fuel ratio feedback control that controls the target air-fuel ratio through proportional-integral-differential control is executed in the first target air-fuel ratio feedback control mode;

a proportional correction term and a differential correction term for the proportional-integral-differential control are each multiplied by the first correction coefficient; and an integral correction term for the proportional-integral-differential control is multiplied by the second correction coefficient.

5. The internal combustion engine air-fuel ratio control apparatus according to claim 4, wherein a target air-fuel ratio feedback control that controls the target air-fuel ratio through proportional-integral-differential control is executed in the second target air-fuel ratio feedback control mode;

a proportional correction term for the proportional-integral-differential control of the second target air-fuel ratio feedback control mode is multiplied by the first correction coefficient and by the third correction coefficient;

a differential correction term for the proportional-integral-differential control of the second target air-fuel ratio feedback control mode is multiplied by the first correction coefficient; and an integral correction term for the proportional-integral-differential control of the second target air-fuel ratio feedback control mode is multiplied by the second correction coefficient.

6. The internal combustion engine air-fuel ratio control apparatus according to claim 2, further comprising:

a load-rate detector that detects a load rate representing the amount of air that has been newly drawn into cylinders of the internal combustion engine, wherein the integral correction term for the first target air-fuel ratio feedback control mode and the integral correction term for the second target air-fuel ratio feedback control mode are each multiplied by a fourth correction coefficient that is made larger the higher the load rate.

7. The internal combustion engine air-fuel ratio control apparatus according to claim 1, further comprising:

an integral-value learning portion that learns an integral value calculated by integrating a deviation of an output value of the oxygen sensor from a target value, wherein if the intake air amount is smaller than the predetermined amount, the air-fuel ratio detected by the oxygen sensor is rich, and the learning by the integral-value learning portion has been completed, the target air-fuel ratio controller discontinues the first target air-fuel ratio feedback control mode and implements a stoicheiometric air-fuel ratio control mode in which the target air-fuel ratio is controlled to a stoicheiometric air-fuel ratio.

8. The internal combustion engine air-fuel ratio control apparatus according to claim 7, further comprising:

an oxygen storage capacity detector that detects the maximum oxygen storage capacity of the exhaust-gas purification catalyst unit; and an oxygen amount detector that detects the amount of oxygen stored in the exhaust-gas purification catalyst unit, wherein the target air-fuel ratio controller references the ratio of the amount of oxygen stored in the exhaust-gas purification catalyst unit to the maximum oxygen storage capacity of the exhaust-gas purification catalyst unit in determining the time to discontinue the first target air-fuel ratio feedback control mode and implement the stoicheiometric air-fuel ratio control mode after it is determined that the intake air amount is smaller than the predetermined amount, the air-fuel ratio detected by the oxygen sensor is rich, and the learning by the integral-value learning portion has been completed.

9. An air-fuel ratio control method for an internal combustion engine having an exhaust-gas purification catalyst unit that has an oxygen storage capability storing oxygen in exhaust gas when the oxygen concentration in exhaust gas flowing into the exhaust-gas purification catalyst unit is excessively high and releasing oxygen stored in the exhaust gas-purification catalyst unit when the oxygen concentration in the exhaust gas is excessively low, the air-fuel ratio control method comprising:

detecting an amount of intake air drawn into the internal combustion engine;

obtaining an output of a linear air-fuel ratio sensor that is provided upstream of the exhaust-gas purification catalyst unit and has an output characteristic that is substantially proportional to the air-fuel ratio of exhaust gas;

obtaining an output of an oxygen sensor that is provided downstream of the exhaust-gas purification catalyst unit and detects whether the air-fuel ratio of exhaust gas is rich or lean;

executing feedback control of a target air-fuel ratio of exhaust gas flowing into the exhaust-gas purification catalyst unit based on the detected intake-air amount and the output of the oxygen sensor; and executing feedback control of a fuel injection amount based on the output of the linear air-fuel ratio sensor such that the air-fuel ratio of the exhaust gas flowing into the exhaust-gas purification catalyst unit equals to the target air-fuel ratio, wherein a first target air-fuel ratio feedback control mode is implemented in which the target air-fuel ratio is controlled through at least proportional-integral control such that, even if the intake air amount changes, the amount by which the amount of oxygen in the exhaust-gas purification catalyst unit is corrected per unit time is maintained at a constant level, a proportional correction term for the proportional-integral control of the first target air-fuel ratio feedback control mode is multiplied by a first correction coefficient that is made smaller the larger the intake air amount;

an integral correction term for the proportional-integral control of the first target air-fuel ratio feedback control mode is multiplied by a second correction coefficient that is made larger the larger the intake air amount, and the target air-fuel ratio is controlled so as to suppress an increase in the air-fuel ratio of atmosphere in the exhaust-gas purification catalyst unit when the intake air amount is smaller than a predetermined amount and the air-fuel ratio detected by the oxygen sensor is rich.

10. The air-fuel ratio control method according to claim 9, wherein if the intake air amount is smaller than the predetermined amount and the air-fuel ratio detected by the oxygen sensor is rich, the first target air-fuel ratio feedback control mode is discontinued and a second target air-fuel ratio feedback control mode is implemented in which the target air-fuel ratio is controlled through at least proportional-integral control;

a proportional correction term for the proportional-integral control of the second target air-fuel ratio feedback control mode is multiplied by the first correction coefficient and by a third correction coefficient that is set in accordance with the intake air amount so as to reduce the correction amount per unit time of the amount of oxygen stored in the exhaust-gas purification catalyst unit; and an integral correction term for the proportional-integral control of the second target air-fuel ratio feedback control mode is multiplied by the second correction coefficient.

11. The air-fuel ratio control method according to claim 10, further comprising:

detecting the maximum oxygen storage capacity of the exhaust-gas purification catalyst unit; and detecting the amount of oxygen stored in the exhaust-gas purification catalyst unit, wherein the ratio of the amount of oxygen stored in the exhaust-gas purification catalyst unit to the maximum oxygen storage capacity of the exhaust-gas purification catalyst unit is referenced in determining the time to discontinue the first target air-fuel ratio feedback control mode and start the second target air-fuel ratio feedback control mode after it is determined that the intake air amount is smaller than the predetermined amount and the air-fuel ratio detected by the oxygen sensor is rich.

12. The air-fuel ratio control method according to claim 10, wherein a target air-fuel ratio feedback control that controls the target air-fuel ratio through proportional-integral-differential control is executed in the first target air-fuel ratio feedback control mode;

a proportional correction term and a differential correction term for the proportional-integral-differential control are each multiplied by the first correction coefficient; and an integral correction term for the proportional-integral-differential control is multiplied by the second correction coefficient.

13. The air-fuel ratio control method according to claim 12, wherein a target air-fuel ratio feedback control that controls the target air-fuel ratio through proportional-integral-differential control is executed in the second target air-fuel ratio feedback control mode;
   a proportional correction term for the proportional-integral-differential control of the second target air-fuel ratio feedback control mode is multiplied by the first correction coefficient and by the third correction coefficient;
   a differential correction term for the proportional-integral-differential control of the second target air-fuel ratio feedback control mode is multiplied by the first correction coefficient; and
   an integral correction term for the proportional-integral-differential control of the second target air-fuel ratio feedback control mode is multiplied by the second correction coefficient.

14. The air-fuel ratio control method according to claim 10, further comprising:
   detecting a load rate representing the amount of air that has been newly drawn into cylinders of the internal combustion engine, wherein
   the integral correction term for the first target air-fuel ratio feedback control mode and the integral correction term for the second target air-fuel ratio feedback control mode are each multiplied by a fourth correction coefficient that is made larger the higher the load rate.

15. The air-fuel ratio control method according to claim 9, further comprising:
   learning an integral value calculated by integrating a deviation of an output value of the oxygen sensor from a target value, wherein
   if the intake air amount is smaller than the predetermined amount, the air-fuel ratio detected by the oxygen sensor is rich, and the learning of the integral value has been completed, the first target air-fuel ratio feedback control mode is discontinued and a stoicheiometric air-fuel ratio control mode is implemented in which the target air-fuel ratio is controlled to a stoicheiometric air-fuel ratio.

16. The air-fuel ratio control method according to claim 15, further comprising:
   detecting the maximum oxygen storage capacity of the exhaust-gas purification catalyst unit; and
   detecting the amount of oxygen stored in the exhaust-gas purification catalyst unit, wherein
   the ratio of the amount of oxygen stored in the exhaust-gas purification catalyst unit to the maximum oxygen storage capacity of the exhaust-gas purification catalyst unit is referenced in determining the time to discontinue the first target air-fuel ratio feedback control mode and implement the stoicheiometric air-fuel ratio control mode after it is determined that the intake air amount is smaller than the predetermined amount, the air-fuel ratio detected by the oxygen sensor is rich, and the learning of the integral value has been completed.

17. The internal combustion engine air-fuel ratio control apparatus according to claim 3, wherein
   a target air-fuel ratio feedback control that controls the target air-fuel ratio through proportional-integral-differential control is executed in the first target air-fuel ratio feedback control mode;
   a proportional correction term and a differential correction term for the proportional-integral-differential control are each multiplied by the first correction coefficient; and
   an integral correction term for the proportional-integral-differential control is multiplied by the second correction coefficient.

18. The internal combustion engine air-fuel ratio control apparatus according to claim 17, wherein
   a target air-fuel ratio feedback control that controls the target air-fuel ratio through proportional-integral-differential control is executed in the second target air-fuel ratio feedback control mode;
   a proportional correction term for the proportional-integral-differential control of the second target air-fuel ratio feedback control mode is multiplied by the first correction coefficient and by the third correction coefficient;
   a differential correction term for the proportional-integral-differential control of the second target air-fuel ratio feedback control mode is multiplied by the first correction coefficient; and
   an integral correction term for the proportional-integral-differential control of the second target air-fuel ratio feedback control mode is multiplied by the second correction coefficient.

19. The air-fuel ratio control method according to claim 11, wherein
   a target air-fuel ratio feedback control that controls the target air-fuel ratio through proportional-integral-differential control is executed in the first target air-fuel ratio feedback control mode;
   a proportional correction term and a differential correction term for the proportional-integral-differential control are each multiplied by the first correction coefficient; and
   an integral correction term for the proportional-integral-differential control is multiplied by the second correction coefficient.

20. The air-fuel ratio control method according to claim 19, wherein
   a target air-fuel ratio feedback control that controls the target air-fuel ratio through proportional-integral-differential control is executed in the second target air-fuel ratio feedback control mode;
   a proportional correction term for the proportional-integral-differential control of the second target air-fuel ratio feedback control mode is multiplied by the first correction coefficient and by the third correction coefficient;
   a differential correction term for the proportional-integral-differential control of the second target air-fuel ratio feedback control mode is multiplied by the first correction coefficient; and
   an integral correction term for the proportional-integral-differential control of the second target air-fuel ratio feedback control mode is multiplied by the second correction coefficient.

* * * * *